(12) United States Patent
Schreter et al.

(10) Patent No.: US 9,348,833 B2
(45) Date of Patent: May 24, 2016

(54) CONSOLIDATION FOR UPDATED/DELETED RECORDS IN OLD FRAGMENTS

(71) Applicants: Ivan Schreter, Malsch (DE); Dirk Thomsen, Heidelberg (DE); Colin Florendo, Malborough, MA (US); Blaine French, Concord, MA (US)

(72) Inventors: Ivan Schreter, Malsch (DE); Dirk Thomsen, Heidelberg (DE); Colin Florendo, Malborough, MA (US); Blaine French, Concord, MA (US)

(73) Assignee: SAP SE, Walldorf (DE)

( * ) Notice: Subject to any disclaimer, the term of this patent is extended or adjusted under 35 U.S.C. 154(b) by 427 days.

(21) Appl. No.: 13/797,710

(22) Filed: Mar. 12, 2013

(65) Prior Publication Data

US 2014/0279962 A1  Sep. 18, 2014

(51) Int. Cl.
*G06F 12/00* (2006.01)
*G06F 17/30* (2006.01)

(52) U.S. Cl.
CPC .... *G06F 17/30153* (2013.01); *G06F 17/30135* (2013.01); *G06F 17/30162* (2013.01)

(58) Field of Classification Search
CPC ................. G06F 17/30162; G06F 17/30153; G06F 17/30135
USPC ........................................................ 707/816
See application file for complete search history.

(56) References Cited

U.S. PATENT DOCUMENTS

| | | | | |
|---|---|---|---|---|
| 2007/0288638 | A1* | 12/2007 | Vuong et al. | 709/226 |
| 2008/0172718 | A1* | 7/2008 | Bradley | 726/1 |
| 2009/0063400 | A1* | 3/2009 | Borkar et al. | 707/2 |
| 2010/0030814 | A1* | 2/2010 | Wong et al. | 707/200 |
| 2011/0153650 | A1* | 6/2011 | Lee et al. | 707/769 |

* cited by examiner

*Primary Examiner* — Jacob F Bétit
*Assistant Examiner* — Van Oberly
(74) *Attorney, Agent, or Firm* — Mintz Levin Cohn Ferris Glovsky and Popeo, P.C.

(57) ABSTRACT

A plurality of data records of a data set can be stored in a plurality of main part fragments, at least one of which is an old fragment stored on-disk. A number of one or more data records in the old fragment that have been marked for deletion can be determined to be greater than a threshold number, and the old fragment can be loaded into main system memory. A merge of the old fragment can be performed to remove the one or more data records marked for deletion.

17 Claims, 19 Drawing Sheets

CONSOLIDATION FOR UPDATED/DELETED RECORDS IN OLD FRAGMENTS

TECHNICAL FIELD

The subject matter described herein relates to use of fragments of tables or columns in a unified architecture for a database.

BACKGROUND

Database sizes supported by commercially available database management systems (DBMS) continue to grow as the availability and cost per unit storage of disk-based storage and system memory increases. In general, a database can feature on-disk storage of data, in which data records are stored in one or more tables or other database structures on storage media (e.g. hard disks, optical storage, solid state storage, or the like) and read into main system memory as needed to respond to queries or other database operations. Alternatively, a database can feature in-memory storage of data, in which data records are stored in main system memory. As costs of main system memory continue to decrease, the feasibility of significant use of in-memory features increases. However, data capacity requirements of database systems also continue to increase. As such, hybrid approaches that involve features of both in-memory and on-disk systems are also advantageous.

In some examples of in-memory databases, a columnar table is composed of a delta part and a main part. The delta part receives changes to the table and stores these changes in a persistent log. Upon recovery, the delta part is rebuilt from the log. A merge process occasionally (e.g. periodically, upon the delta reaching a certain size, etc.) occasionally updates the main part. The merge process typically copies a current main state and committed rows in the delta part into a new temporary state, sorts the data for optimal compression, and overwrites the original main part. Committed rows are removed from the delta part at the time of overwriting the original main part. To prevent blocking situations during the merge process, a new delta part is typically opened as soon as the merge process starts. Uncommitted rows can be copied from the old delta part to the new delta part. Query processing can use a single delta in combination with the current main part (when a merge process is not currently in progress) or both of an old delta part and a new delta part in combination with the old main part (when a merge process is currently in progress) to execute queries.

SUMMARY

In one aspect, a method includes storing a plurality of data records that comprise a data set in a plurality of main part fragments. The plurality of main part fragments includes an old fragment stored on-disk. The method further includes determining that a number of one or more data records in the old fragment that have been marked for deletion is greater than a threshold number, loading the old fragment into main system memory, and performing a merge of the old fragment to remove the one or more data records marked for deletion.

In some variations one or more of the following features can optionally be included in any feasible combination. A method can further include determining a total number of data records not marked for deletion in the old fragment plus a second old fragment that is adjacent to the old fragment is less than a defined maximum fragment size, loading the second old fragment into main system memory, and also performing a join of the old fragment and the second old fragment to generate a single old fragment. The merge and the join can be performed for the old fragment and the second old fragment in a single combined operation. The merge can include creating a temporary, in-memory data structure containing data from the old fragment and committed rows from an existing delta, re-sorting the temporary, in-memory data structure to allow achievement of maximal compression of the data records, and storing data from the re-sorted, temporary, in-memory data structure to a new version of the old fragment. Each fragment of the plurality of main part fragments can include a local row index and a mapping of the local row index to RowID values in a global RowID column for the data set. The RowID values in the RowID column can be unique, logical references to the data records of the data set. The local row index can include physical locations of the data records in the main part fragment. Each of the plurality of main part fragments can include at least one row set arranged in a temporal order.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

Figure 1:
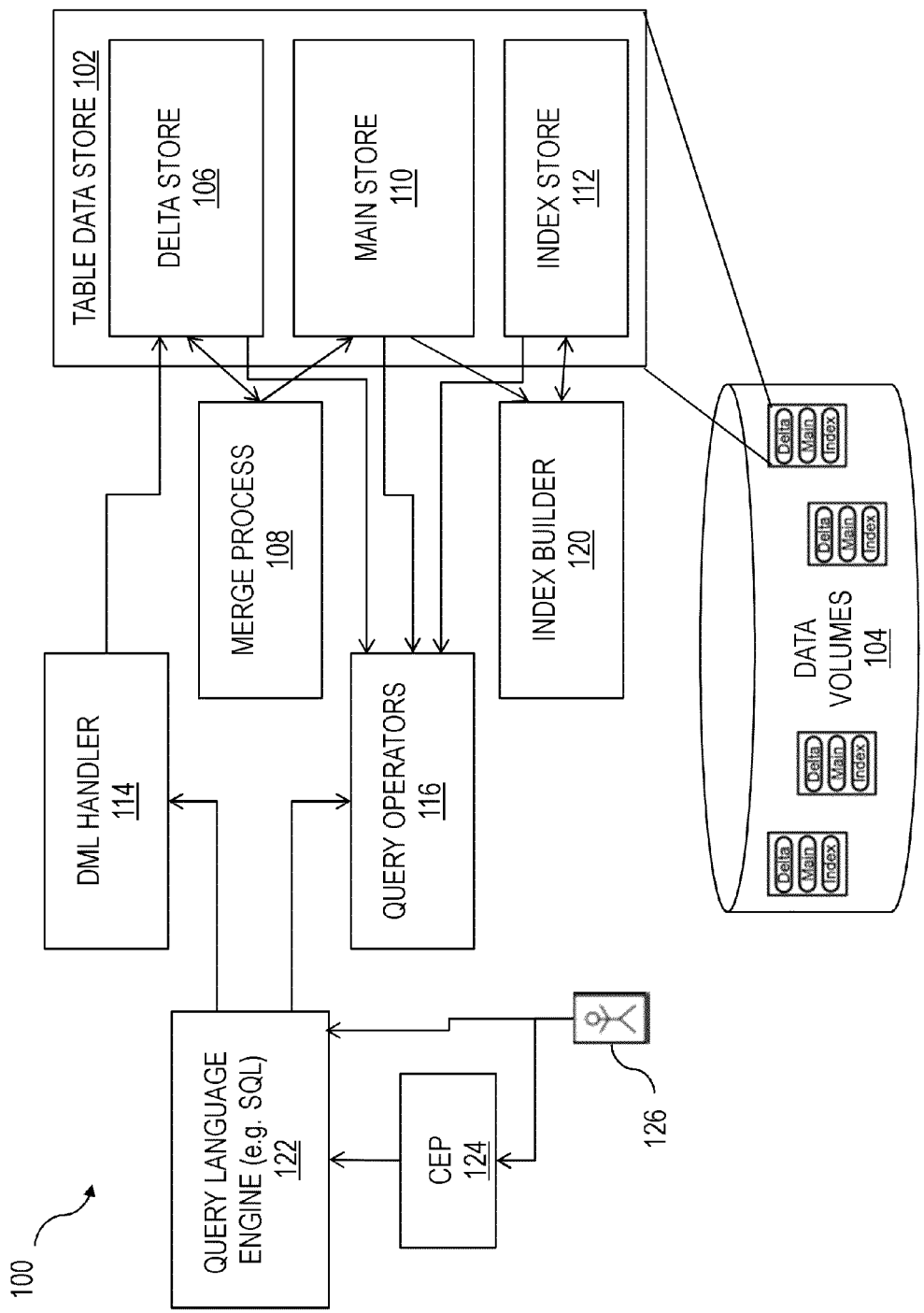
FIG. 1 shows a block diagram illustrating features of a business software architecture consistent with implementations of the current subject matter.

The current subject matter includes a number of aspects that can be applied individually or in combinations of one or more such aspects to support a unified database table approach the integrates performance advantages in-memory database approaches with reduced storage costs of on-disk database approaches. For example, on-demand paging of columnar main fragments (in contrast to paging in individual pages of dictionary-compressed columns) can be used, and a multi-segmented indexing scheme can improve indexing of large on-disk data sets.

In one such aspect, one or several main fragments can be used for each table or column of a database. For example, very large tables can be split into two or more fragments, while smaller, more manageable tables can be represented in a single fragment. Fragments consistent with implementations of the current subject matter can advantageously be sufficiently large to gain maximum performance due to optimized compression of the fragment. Conversely, such fragments can be sufficiently small to load a largest column of any given fragment into memory and to sort the fragment in-memory. Fragments can also advantageously be sufficiently small to be able to coalesce two or more partially empty fragments into a smaller number of fragments as discussed in greater detail below. As an illustrative and non-limiting example of this aspect, a fragment can contain one billion rows with a maximum of 100 GB of data per column. Other fragment sizes are also within the scope of the current subject matter. A fragment can optionally include a chain of pages. Alternatively, a column can optionally include a chain of pages. Column data can be compressed, for example using a dictionary and/or any other compression method. Table fragments can be materialized in-memory in contiguous address spaces for maximum performance.

In another aspect, one or more on-disk operations on the fragments of a fragmented database to support very large data sets. All fragments of the database are stored on-disk, and access to these fragments can be made by one of several (e.g. three) approaches based on an analysis of the data access requirement of a query or other request for access to the data.

In another aspect, a consolidation or "garbage collection" approach can be used for handling of updated or deleted records in older fragments of the database. Features of this aspect can include evaluating old fragments to determine if a number of deleted or updated rows in the fragment has exceeded a threshold number (absolute or relative to the row size of the fragment), and if so, the fragment can be loaded into memory to perform a merge operation to eliminate the deleted rows. Additionally, when two (or optionally more) adjacent fragments become sufficiently small (e.g. their combined row count decreases below a size threshold), the fragments can be joined into a single fragment.

In still another aspect, data temperature handling can be handled on a fragment scale as opposed to a page scale as has been typical of currently available approaches. Data that have more recently been added to the table (e.g. that have "arrive" more recently) have a higher temperature. As data arrives at the table, it is placed in a delta part. If the newly data includes an update to an existing record, the existing record is marked for deletion in the main fragment. Handling of the deletion can vary depending on whether the update is to a record in a hotter (e.g. more recent) or colder (e.g. less recent) fragment.

In yet another aspect, hierarchical indices can be used for data stored using a fragment approach as discussed herein. The hierarchical indices can be created for main fragments and can reduce the number of indexes that must be accessed as part of a lookup operation on data stored on-disk.

Features relevant to one or more of these aspects and possibly to other aspects of the current subject matter will be further understood by reference to the following detailed description of example implementations and to the figures. Among other possible uses and advantages, the current subject matter can be implemented in database systems using in-memory OLAP, for example including databases sized at several terabytes (or more), tables with billions (or more) of rows, and the like; systems using in-memory OLTP (e.g. enterprise resource planning or ERP system or the like, for example in databases sized at several terabytes (or more) with high transactional volumes; systems using on-disk OLAP (e.g. "big data," analytics servers for advanced analytics, data warehousing, business intelligence environments, or the like), for example databases sized at several petabytes or even more, tables with up to trillions of rows, and the like.

In the interest of maximizing database performance (e.g. speed of query execution, etc.), in-memory table access can advantageously be used as much as is possible given the main memory resources available to a database management system. For example, a database management system can default to scanning an entire column into main memory assuming that the whole column fits in the available memory. Larger tables can page in data as needed, in a column fragment-wise manner. An optimizer (explained in more detail below) can apply one or more rules or algorithms to decide, based on one or more of data size, current resource consumption, access pattern, and the like, how to treat a column or multiple columns of data.

Another feature that can be advantageously included in one or more implementations of the current subject matter is the ability to import on-disk database tables. Lazy, in-place migration can be useful, for example in the case of very large (e.g. petabytes or bigger) data volumes. As used herein, lazy migration refers to a process in which data records are migrated from a first database, database table, or other database structure or sub-structure only as they are needed. In contrast, a conventional database migration occurs as one or more discrete unit processes in which all records of a specific portion of a database (or in some examples the entire database) are migrated from an initial database, database table, or other database structure to a target database, database table, or other database structure. Using lazy migration in association with a conversion of an on-disk database system to an in-memory or hybrid in-memory/on-disk database system can involve transitioning data records from the disk media of the on-disk database system to an in-memory storage approach at the time that access to those data records is requested within the target database system. The transitioning of data records from the initial database, database table, or other database structure to a target database, database table, or other database structure can optionally involve one or more reformatting, reconfiguring, or other processes.

Consistent with implementations of the current subject matter, it can be advantageous to minimize downtime of the database system during a migration. Explicit actions to perform a migration can optionally be performed (e.g. a lazy migration pages consistent with an on-disk approach to an updated page version consistent with the target database).

To provide improved data safety, shorter downtime, and other potential advantages, it can be possible to attach an on-disk volume in a read-only manner and to perform lazy migration of data records to a new data space (e.g. in the target database system) while the initial database system can continue to work on the original volume. Additional advantages that can be provided through one or more implementations of the current subject matter can include query performance on large data sets that is at least as good as can be achieved by an entirely on-disk approach, and merge process times that are bounded (e.g. not limitless) and that do not depend on total table size.

FIG. 1 shows a block diagram of an architecture 100 illustrating features that can be included in a database or database management system consistent with implementations of the current subject matter. A table data store 102, which can be retained among a plurality of data volumes 104 can include one or more of a delta store 106 (e.g. a paged delta part, which can optionally be OLTP optimized and can optionally include a merge process 108), a main store 110 (e.g. a main part that is fragmented consistent with features described herein and that can be compressed), and an index store 112 (e.g. one or more segmented indices). Other parts of the architecture can include a data manipulation language (DML) handling module or similar functionality 114, one or more query handling modules or similar functionality 116 (e.g. including multi-version concurrency control), and the like, an index builder 120 that supports the index store 112, a query language engine 122 (which can, for example, be a SQL engine), a complex events processing module (e.g. an event handler, a stream processing module, etc.) 124 for receiving inputs from a user 126, and the like.

Figure 2:
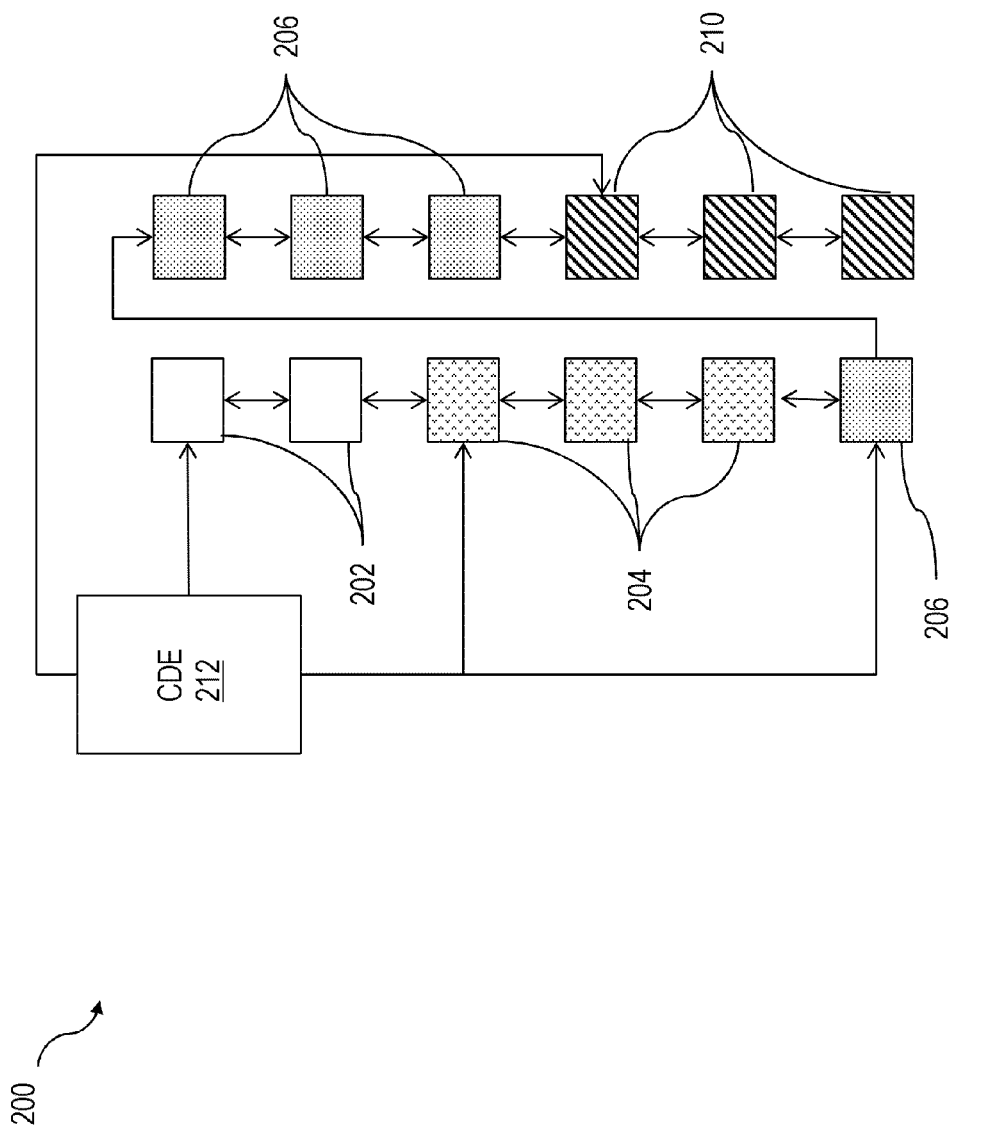
FIG. 2 shows a diagram illustrating features of a unified table container page chain consistent with implementations of the current subject matter.

FIG. 2 shows a block diagram illustrating an example of a unified table container page chain 200. In general, a container can be represented as a page chain. A page chain can generally be characterized as a set of pages that are linked in a given order. The term pages, as used herein, refers to a basic unit of storage in a database. A page size used by server's page size is generally established when the database is built, and typically cannot be changed. A representative page size can be on the order of 2 kB, 4 kB, 8 kB, 16 kB, or the like. Once the server is built the value usually cannot be changed. Different types of pages can store different types of database objects. For example, data pages can store data rows or columns for a table. Index pages can store index rows for one or more (or all) levels of an index. Large object (LOB) pages can store data for text and image columns, for Java off-row columns, and the like.

Also as shown in FIG. 2, sub-chains of the page chain can be defined for a delta part, a main part, dictionaries, index segments (optionally, not shown in FIG. 2), and the like such that a "whole" of each of these entities contains one or more pages. In some implementations of the current subject matter, a delta part can include both "hot" delta fragments 202 and "cold" delta fragments 204, which can be stored separately. The main part can also be subdivided into main fragments 206. Pages containing dictionary-compressed columnar data 210 can refer to pages containing dictionaries for them. Individual table parts can be loaded into main memory on-demand. A merge process can be decoupled from transaction handling such that a merge process can be executed at recovery time (e.g. during log replay). A page chain such as the example shown in FIG. 2 can be initiated by a container directory entry (CDE) 212.

A single RowID space can be used across pages in a page chain. A RowID, which generally refers to a logical row in the database, can be used to refer to a logical row in an in-memory portion of the database and also to a physical row in an on-disk portion of the database. A row index typically refers to physical 0-based index of rows in the table. A 0-based index can be used to physically address rows in a contiguous array, where logical RowIDs represent logical order, not physical location of the rows. In some in-memory database systems, a physical identifier for a data record position can be referred to as a UDIV or DocID, which can differ from a logical RowID in that the UDIV or DocID (or a comparable parameter) indicates a physical position of a row (e.g. a data record) while the RowID indicates a logical position. To allow a partition of a table to have a single RowID and row index space consistent with implementations of the current subject matter, a RowID can be assigned as a monotonically increasing ID for newly-inserted records and for new versions of updated records across fragments. In other words, updating a record will change its RowID, for example because an update is effectively a deletion of an old record (having a RowID) and insertion of a new record (having a new RowID). Using this approach, a delta store of a table can be sorted by RowID, which can be used for optimizations of access paths. Separate physical table entities can be stored per partition, and these separate physical table entities can be joined on a query level into a logical table.

When an optimized compression is performed during a columnar merge operation to add changes recorded in the delta part to the main part, the rows in the table are generally re-sorted. In other words, the rows after a merge operation are typically no longer ordered by their physical row ID. Therefore, stable row identifier can be used consistent with one or more implementations of the current subject matter. The stable row identifier can optionally be a logical RowID. Use of a stable, logical (as opposed to physical) RowID can allow rows to be addressed in REDO/UNDO entries in a write-ahead log and transaction undo log. Additionally, cursors that are stable across merges without holding references to the old main version of the database can be facilitated in this manner. To enable these features, a mapping of an in-memory logical RowID to a physical row index and vice versa can be stored. In some implementations of the current subject matter, a RowID column can be added to each table. The RowID column can also be amenable to being compressed in some implementations of the current subject matter.

Figure 3:
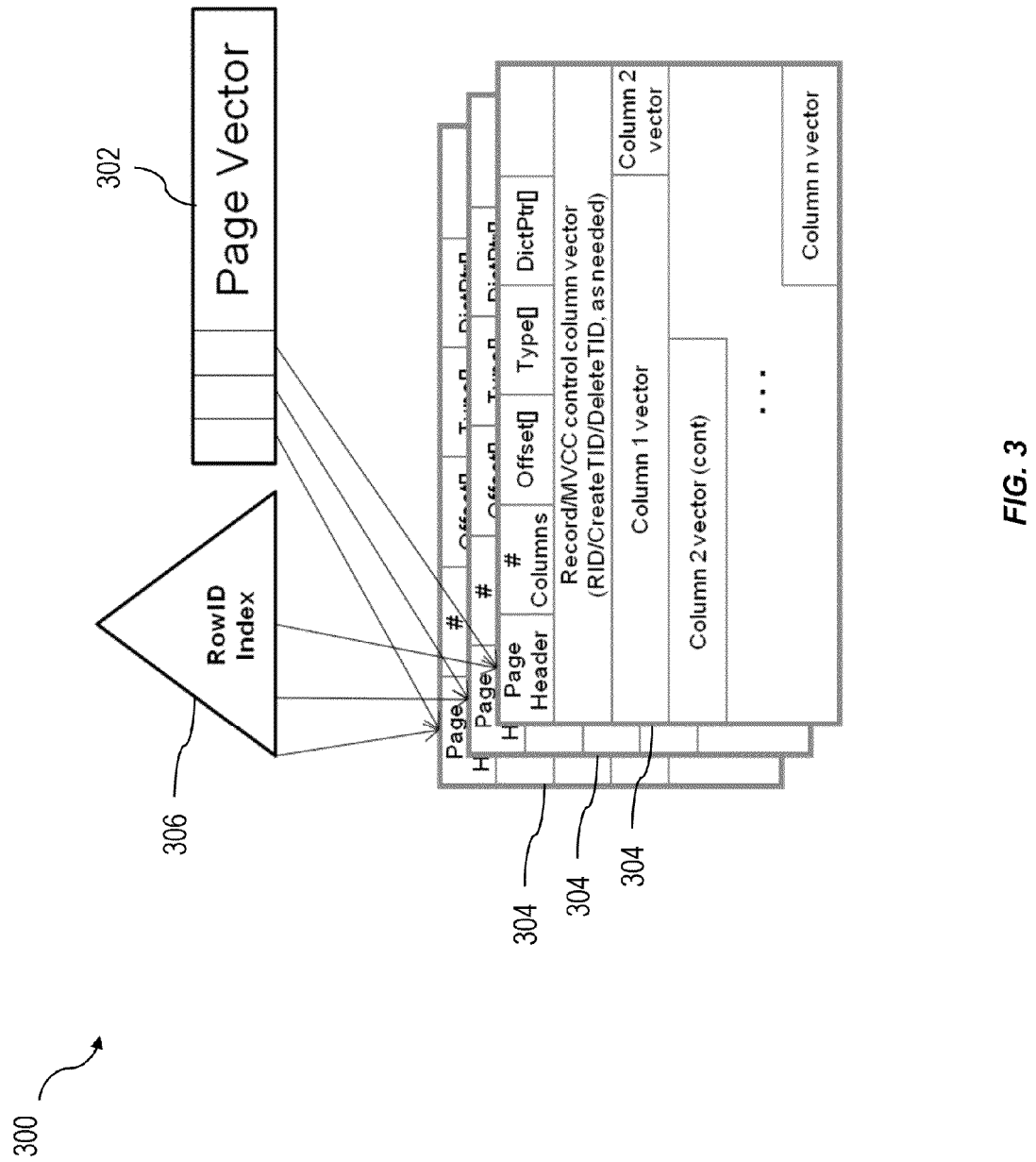
FIG. 3 shows a diagram illustrating features of a unified table delta consistent with implementations of the current subject matter.

FIG. 3 shows a block diagram of a unified table delta 300 consistent with one or more implementations of the current subject matter. In some examples, a "hot" and "cold" delta approach can be used in which uncompressed data are retained in the "hot" delta part while dictionary-compressed data are retained in the "cold" delta part with a mini-merge performed between the hot and cold parts. Such a delta part can be considered as a single container. As shown in FIG. 3, each delta sub-chain can have its own transient structure. In other words, a separate structure can be used for each delta. A page vector 302 can hold page handles to individual pages 304 and can allow a fast iteration over the pages 304 (for example as part of a column or table scan). A page handle to an individual page 304 can include a pin or the like held in memory. As used herein, the term "pin" refers to holding a particular data page (which may also have been stored on disk) in memory. As an example, if a page is not pinned, it can be cleared from memory given it can be retrieved from disk if needed. Pinning is typically done on data paged being actively accessed so as to avoid potential performance degradations associated with reading the page from disk into memory.

A RowID index 306 can serve as a search structure to allow a page 304 to be found based on a given interval of RowID values. The search time can be on the order of log n, where n is very small. The RowID index can provide fast access to data via RowID values with a negligible (e.g. less than approximately 5%). For optimization, "new" pages can have a 1:1 association between RowID and row index, so that simple math (no lookup) operations are possible. Only pages that are reorganized by a merge process need a RowID index in at least some implementations of the current subject matter.

On-page RowID access consistent with implementations of the current subject matter can be provided as follows. Newly or recently created pages generally have no "holes" (or perhaps only very few holes) in the RowID list as it is unlikely that such pages would have undergone many updates or deletions of data records stored therein. A memory optimization for such cases can include only storing starting RowID values in a page. Older data, for example data at the beginning of a second delta fragment can be accessed via a binary search on the order of log n for a small value of n. A delta can, in at least some implementations of the current subject matter, remain always sorted by RowID.

Figure 4:
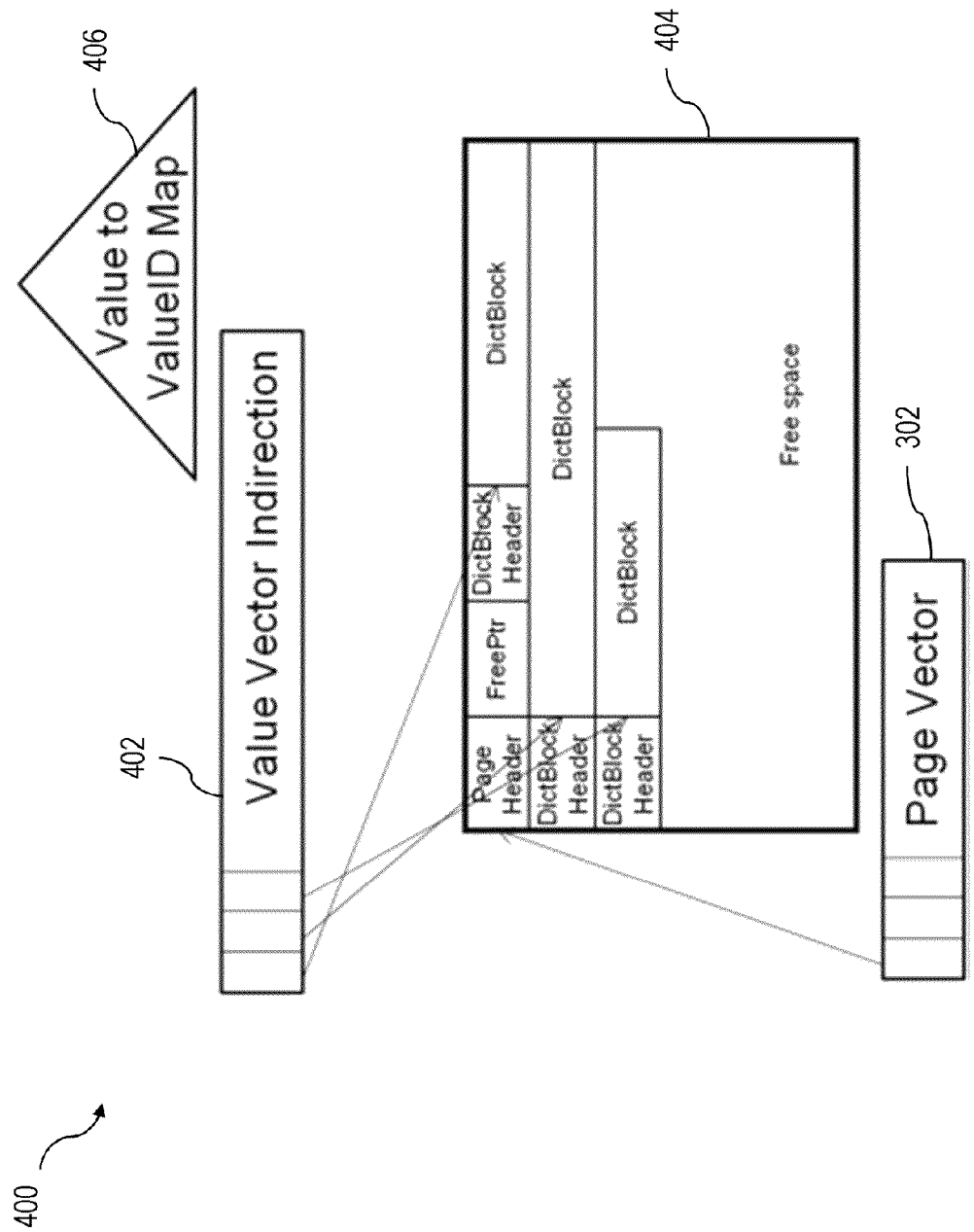
FIG. 4 shows a diagram illustrating features of a unified table unsorted dictionary consistent with implementations of the current subject matter.

FIG. 4 shows a block diagram of a unified table unsorted dictionary 400. Consistent with one or more implementations of the current subject matter, column data in a delta part can use unsorted dictionaries. A transient structure can be provided per delta column dictionary. The page vector 302 can handle pinning of pages in memory. Direct access can be provided via a pointer from other structures. A value vector indirection 402 can allow a same number of values per dictionary block 404. This capability can support an order of 1 performance cost for lookup of a value by ValueID. A dictionary can assign a unique ValueID (typically a numeric value) to each unique value such that the unique values (which are typically larger in memory size than the ValueID) can be stored once rather than multiple times. A Value array is a structure used by the dictionary to retrieve values given a ValueID or vice versa. This technique, which can reduce the amount of memory needed to store a set of values where the values are not unique, is typically referred to as dictionary compression. A value to ValueID map 406 can support hash or Btree sizes on the order of 1 or on the order of log n for lookup of ValueID by value. A B-tree is a tree data structure that keeps data sorted and allows searches, sequential access, insertions, and deletions in logarithmic time. This capability can be necessary for dictionary compression. A Btree can be better for range scans, etc., but can be more expensive to maintain.

To achieve a best possible compression and also to support very large data tables, a main part of the table can be divided into one or more fragments. Main fragment size can be limited to some practical limit, which can, dependent on the specifics of a given implementation of the current subject matter, be sufficiently large to gain maximum performance due to optimized compression, sufficiently small to allow loading of a largest column of a fragment into main system memory and sorting of that column in main system memory, and sufficiently small to allow coalescing of two or more partially-empty fragments into a smaller number of fragments. One or more main fragments can be created for a table in a database. These fragments can contain row sets arranged in a temporal order.

Figure 5:
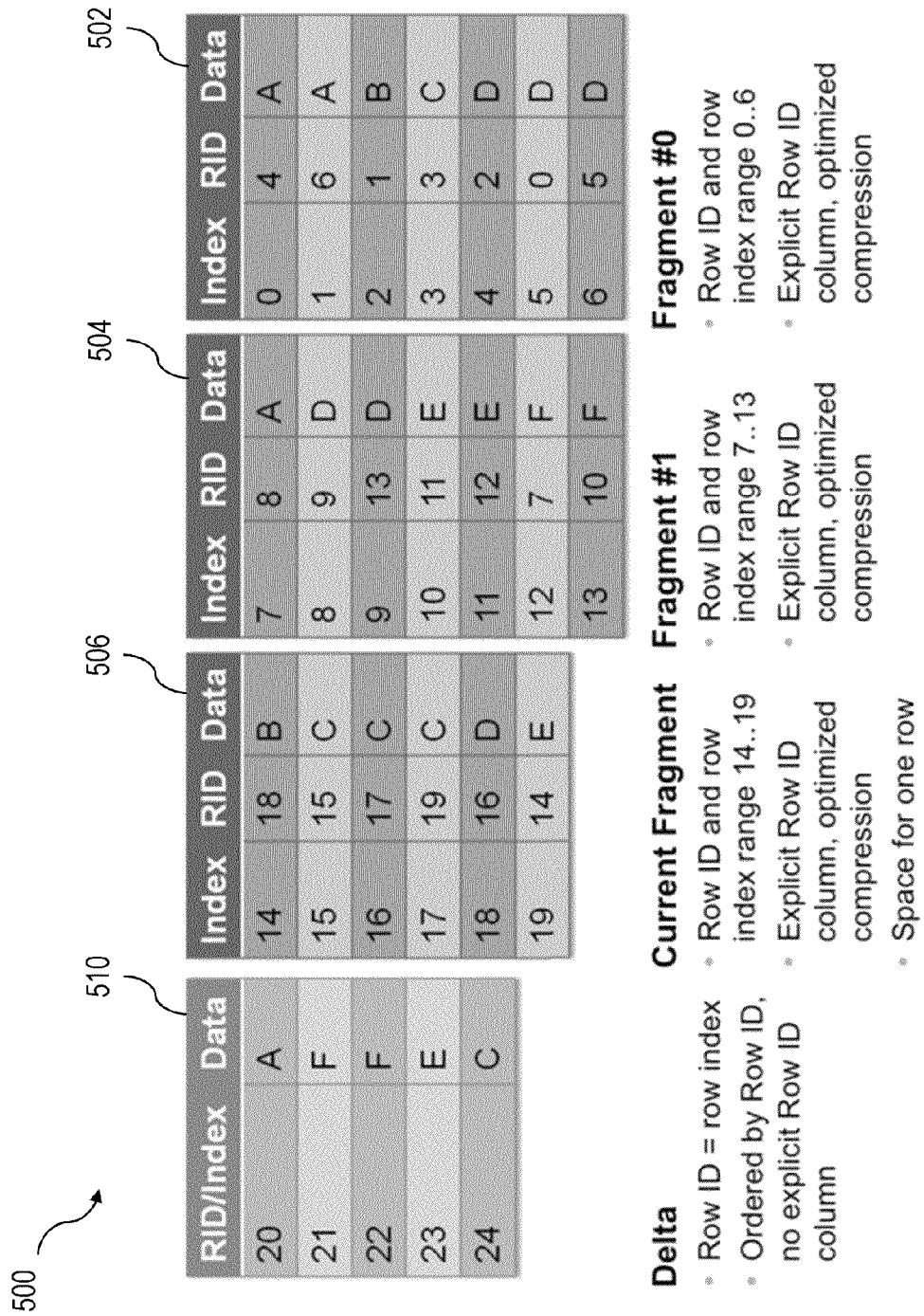
FIG. 5 shows a set of fragments illustrating features of an example of main part fragments consistent with implementations of the current subject matter.

Merge complexity can be capped at an upper limit on the order of k, where ☐ is the maximum size of the fragment (e.g. in rows). When a fragment reaches its maximum size, a new fragment can be started. FIG. 5 shows a diagram illustrating a set 500 of table fragments having features consistent with implementations of the current subject matter. In the example of FIG. 5, a main table is divided into three fragments, a fragment #0 502, a fragment #1 504, and a current fragment 506. In this simplified example, a maximum fragment size is set at 7 rows. ($\hat{k}=7$).

Each main fragment 502, 504, 506 can contain column fragments with optimally compressed column data for each column. The optimal compression of the column data for each column can be valid at the time of fragment creation stored in a page chain. Each main fragment 502, 504, 506 can also contain a compressed, sorted dictionary for the particular column fragment or, alternatively, a reference to a shared dictionary. A RowID (RID) column can also be included, and can advantageously store compressed RIDs for individual row indices). Because fragments are created in temporal order consistent with at least some implementations of the current subject matter, a fragment-local RID to row index mapping can map row indices from n to m to RIDs n±$\epsilon_1$ to m±$\epsilon_2$. In other words, a fragment is capable of including gaps or jumps in the RowID sequence. The simple example of FIG. 5 illustrates exact mapping. A locality of reference can exist, and the mapping can require a relatively small number of bits per value. In real world applications, row index to RID mappings of adjacent fragments can overlap slightly, for example because transactions on the table may not complete in a perfect transaction ID order. This effect is also discussed briefly below in reference to support for UPDATE and DELETE operations in a fragmented table.

Column fragments of a main fragment can contain the same number of values, namely one per row, which is part of the main fragment. Extremely different data distribution or cardinality in different columns can cause huge fragments for some columns while fragments of other columns can be relatively small. Column fragments and their respective dictionaries can be materialized in memory in contiguous address space for maximum performance. Scan algorithms usable in an in-memory high performance database can be readily adapted for use with a fragmented column approach as discussed herein with similar performance.

For larger tables, column fragments can be paged in and out on-demand in a manner similar to paging in and out individual database pages, achieving similar effect as scanning on-disk columns. However, due to optimized compression, these column fragments can in some implementations of the current subject matter be better compressed, so individual scans can be faster. Random access to data in order to materialize results can, however, be more expensive. In order to address this issue, individual pages of a column fragment page chain can also be paged in to minimize random disk input/output accesses. When all pages of a column fragment are paged in, they can be copied to contiguous memory for faster operation.

Consistent with implementations of the current subject matter, operations on column data can be performed using one or more approaches. In order of decreasing performance, these approaches can include fully loading all column fragments of a table into contiguous memory (i.e. full in-memory operation), paging of individual column fragments for large tables, and accessing columnar data directly on individual pages. An optimizer can decide which approach to use based on resources available and query characteristics. When all column fragments loaded into memory, the database can have similar performance characteristics as in an in-memory high speed database implementation in which a table is included in a single fragment. When the size of column fragments in one table is too big to be fully loaded into system memory, column fragments can be paged in on-demand. This approach can correspond to a hybrid of disk-based and in-memory access with performance falling in a range between the extremes of fully in-memory operation and fully on-disk operation. In some implementations of the current subject matter, decreasing data temperature (and resource disposition in resource container) can be associated with older fragments, which can result in better cache replacement policy. In other words, newer fragments with "hot" data can be preferentially kept in memory while older fragments containing data that is less likely to be accessed frequently can be preferentially stored on-disk and loaded into system memory on-demand. Random access can be used for accessing of individual column pages, such as for example for projection in large tables. If all pages of a column are paged in, the column can be copied into contiguous system memory to speed up further operation.

A merge process can advantageously address only an active main fragment (e.g. a current fragment 506 as in FIG. 5, etc.). This fragment can be overwritten as part of the merge. RowIDs can advantageously stay constant during a merge process. A merge process can, at its most basic level, include starting a new delta part (e.g. if a delta part was not previously started, for example by a previously failed merge process) and directing further data manipulation language (DML) operations on the table to the new delta part.

Figure 6:
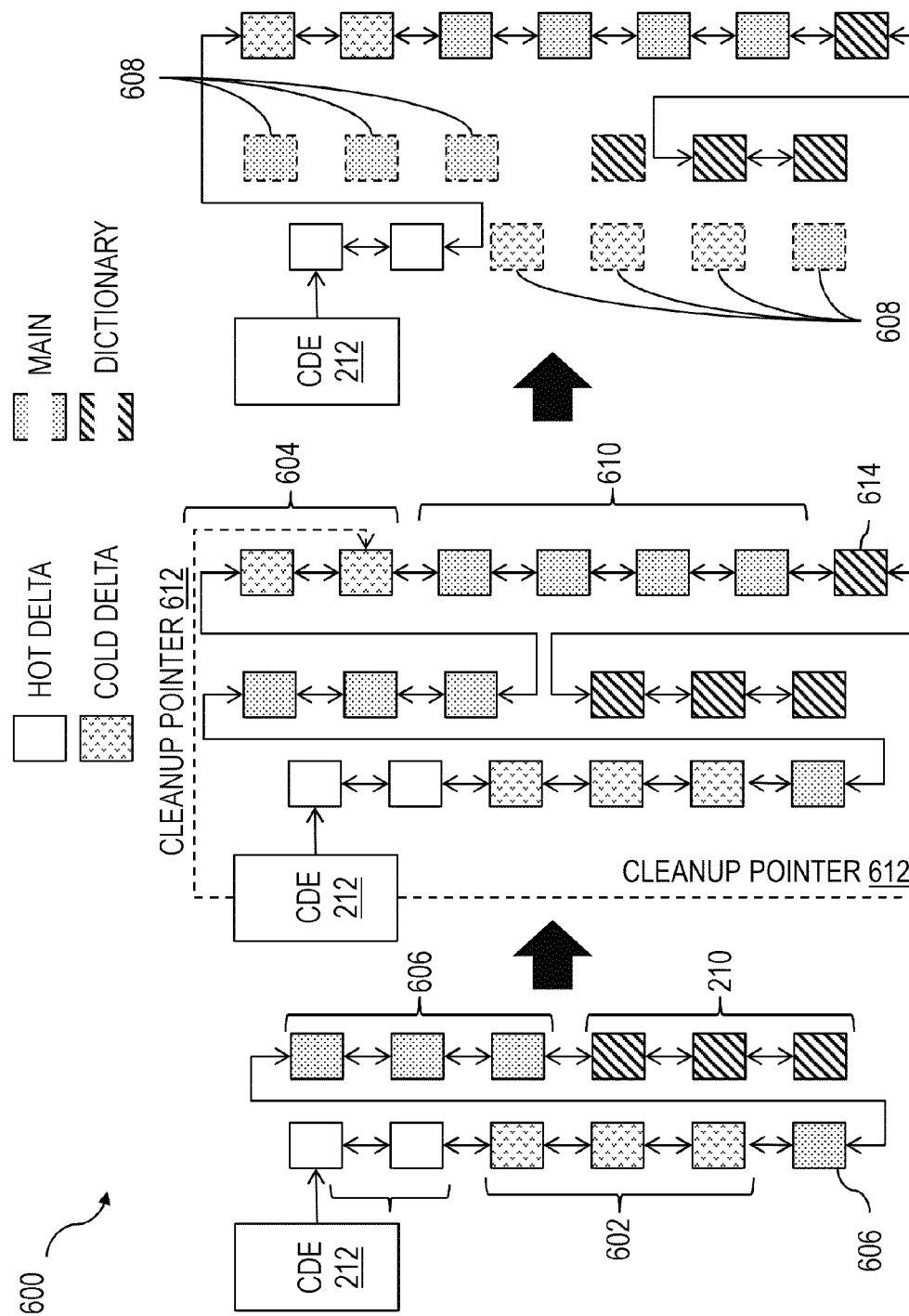
FIG. 6 shows a diagram illustrating features of a simplified example of a merge process consistent with implementations of the current subject matter.

FIG. 6 shows a diagram illustrating an example sequence 600 of a simplified merge process for a fragmented table. As shown in FIG. 6, uncommitted rows are copied from an existing delta part 602 to a new delta part 604, and a temporary in-memory data structure containing data from an existing main fragment 606 and committed rows in the existing delta 602 is created. The temporary structure 608 is re-sorted into a form that can allow achievement of maximal column compression. A new main fragment 610 stores data from the temporary in-memory data structure 608, and the old delta is removed. To address a potential issue of a savepoint being blocked during the merge, cleanup pointers 612 can be stored at the start of the merge. The cleanup pointers 612 can be used to indicate the start and stop of the new pages created by the merge, which if not completed through savepoint, are considered uncommitted and will be removed on crash recovery if a crash occurs before the savepoint completes. New pages for new version of the main fragment 610 and dictionaries 614 can be materialized between these two cleanup pointers 612. If the merge fails (e.g., due to an out of memory event, a power outage or system crash during the merge process, etc.), the sub-chain between cleanup pointers 612 can be simply dropped. A simple example of the use of cleanup pointers is shown in FIG. 6, which shows an example of a successful merge.

A maximum fragment size can be defined for a database. This definition can take one or more of many forms, such as for example in terms of column byte size, number of rows, etc. A maximum fragment size can also be defined also per table. When a merged fragment reaches this maximum size, a new active fragment can be started for the next merge. Closed fragments can generally stay stable aside from delete operations.

Additional benefits or advantages of using a fragmented main consistent with one or more implementations of the current subject matter can include facilitating optimal compression and performance for in-memory operations and very good compression for large on-disk tables, allowing the partitioning of query work by fragment. For example, disk data locality can be supported by fragment, and can be used for shared-disk work scheduling on multiple nodes.

In general, an UPDATE to a record can be treated as a combination of a DELETE of a previous version of the record and an INSERT of the new version of the record. In other words, a new RowID is assigned. For a DELETE of a record, a row can be marked as deleted, for example during a multi-version concurrency control (MVCC) process. In a non-MVCC process, the row can be marked as deleted in an existence bitmap at transaction garbage-collection time or via some other functionally similar approach. Deleted rows can be garbage-collected at a later time. In a MVCC implementation, some information can be required to be associated with each row, e.g., by means of adding additional MVCC column(s) (see also Data Versioning and Visibility).

Figure 7:
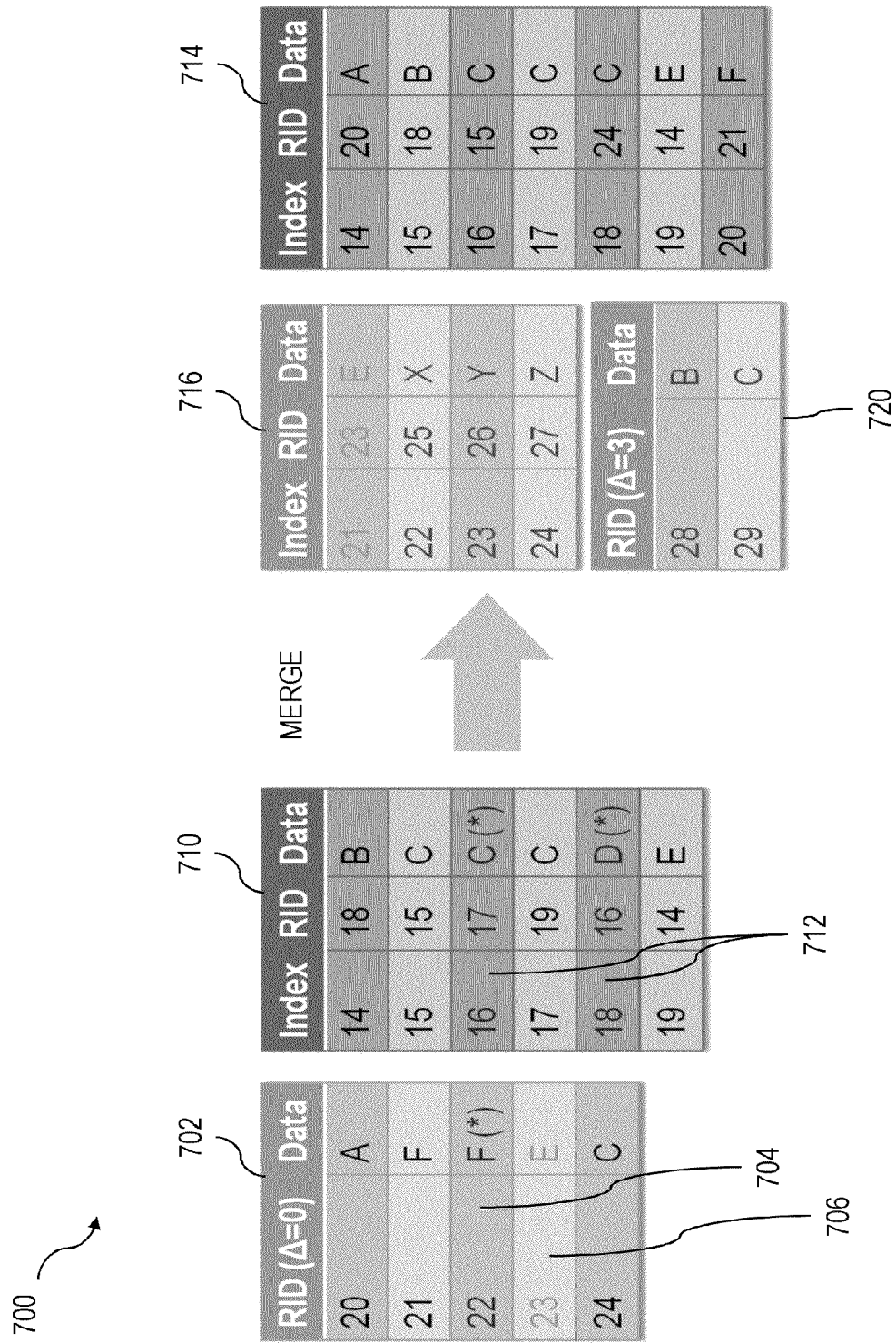
FIG. 7 shows a set of fragments illustrating features of an example of garbage collection of deleted rows at merge consistent with implementations of the current subject matter.

In the event that a deleted row belongs to a delta part or to an active main part fragment, it can be removed at a next merge process, for example as illustrated in FIG. 7, which shows a set 700 of delta and main fragments illustrating an example of garbage collection of deleted rows at the time of (e.g. after completion of) a merge process. In this example, the pre-merge delta part 702 includes a deleted record 704 and an uncommitted record 706. In the pre-merge delta, the RowID value for each row is equivalent to the row index, and no explicit RowID column is required. The active main fragment 710 in this example includes a RowID and row index range between 14 and 19 and includes an explicit RowID column. The active main fragment also has optimized compression. Two main fragment rows 712 have been deleted prior to the merge in this example. After the merge, the merged active main fragment 714 includes a RowID range between 14 and 24 and also a row index range with the same values. A first page 716 of the new (e.g. post-merge) delta fragment can require a RowID column. Because uncommitted rows are copied to the new delta fragment, the RowIDs within that new fragment may not be contiguous and therefore generally cannot be expressed in terms of the row index plus an offset. As such, a mapping is required. Additional pages 720 of the new delta fragment can omit the RowID column provided that each page includes a Δ value (in this example 3) that indicates an offset of the RowID from the row index (e.g. Δ=RID−row index).

Figure 8:
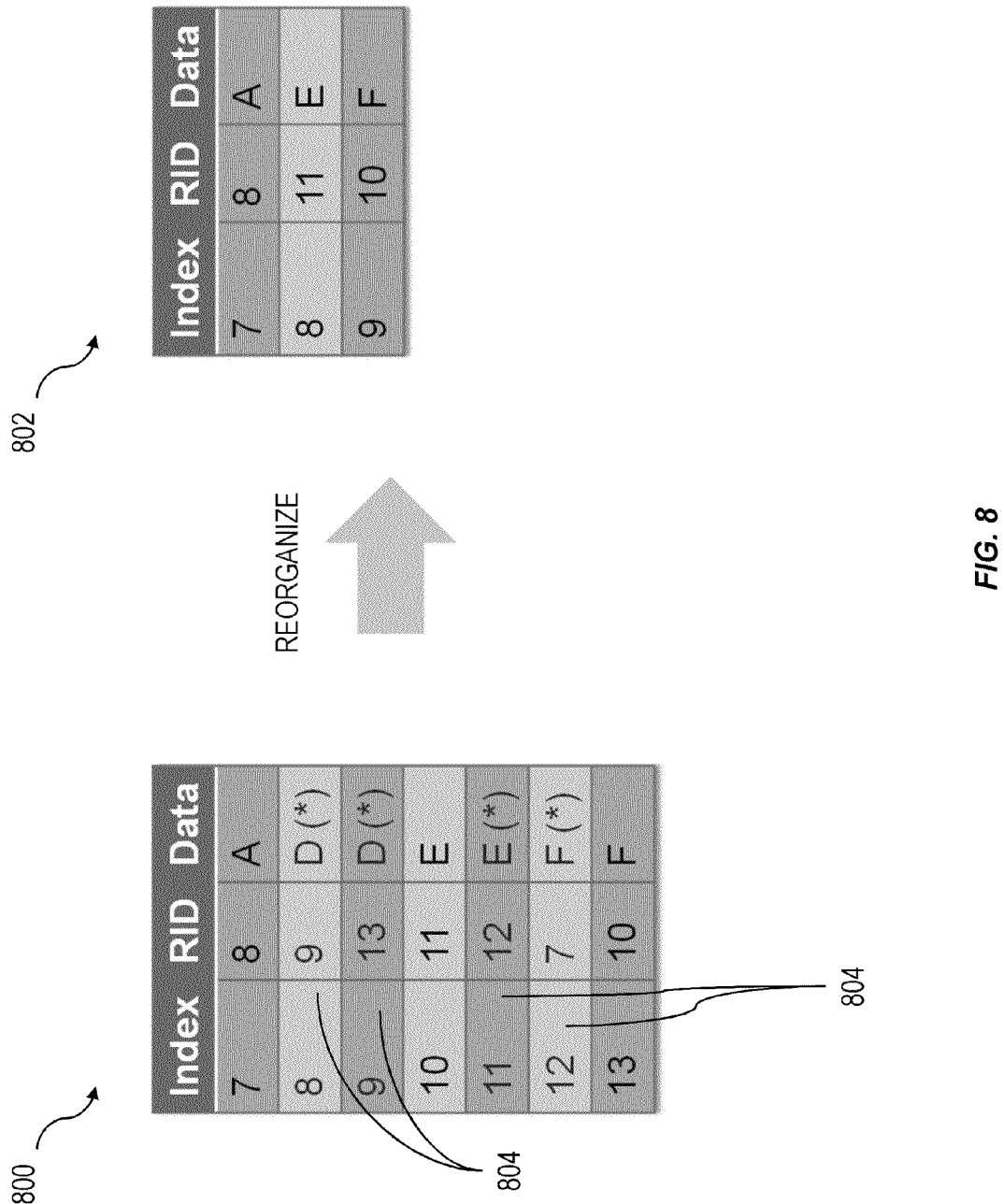
FIG. 8: Example Garbage Collection of Deleted Rows at Fragment Reorganization

FIG. 8 shows changes of a fragment 800 that undergoes reorganization consistent with implementations of the current subject matter to become a reorganized fragment 802 as part of a garbage collection approach for deleted rows at a time of fragment reorganization. In a case in which a deleted row belongs to an already closed fragment, a count of deleted rows for this fragment can be increased on each deletion. When a count of deleted rows for a fragment 800 reaches a certain, predefined threshold, local reorganization of the fragment 800 can be triggered to remove holes, thereby making the fragment smaller as can be better understood in reference to FIG. 8. In FIG. 8, the fragment 800 includes four deleted rows 804 prior to reorganization. Both a RowID and a row index range are 7 to 13 for this example. In the reorganized fragment 802, these deleted rows are removed. The RowID values for the non-deleted records remain stable in the reorganized fragment 802 relative to the fragment prior to reorganization. A new row index range in the reorganized fragment 802 is 7 to 9, and the row index includes holes for the range 10-13.

Figure 9:
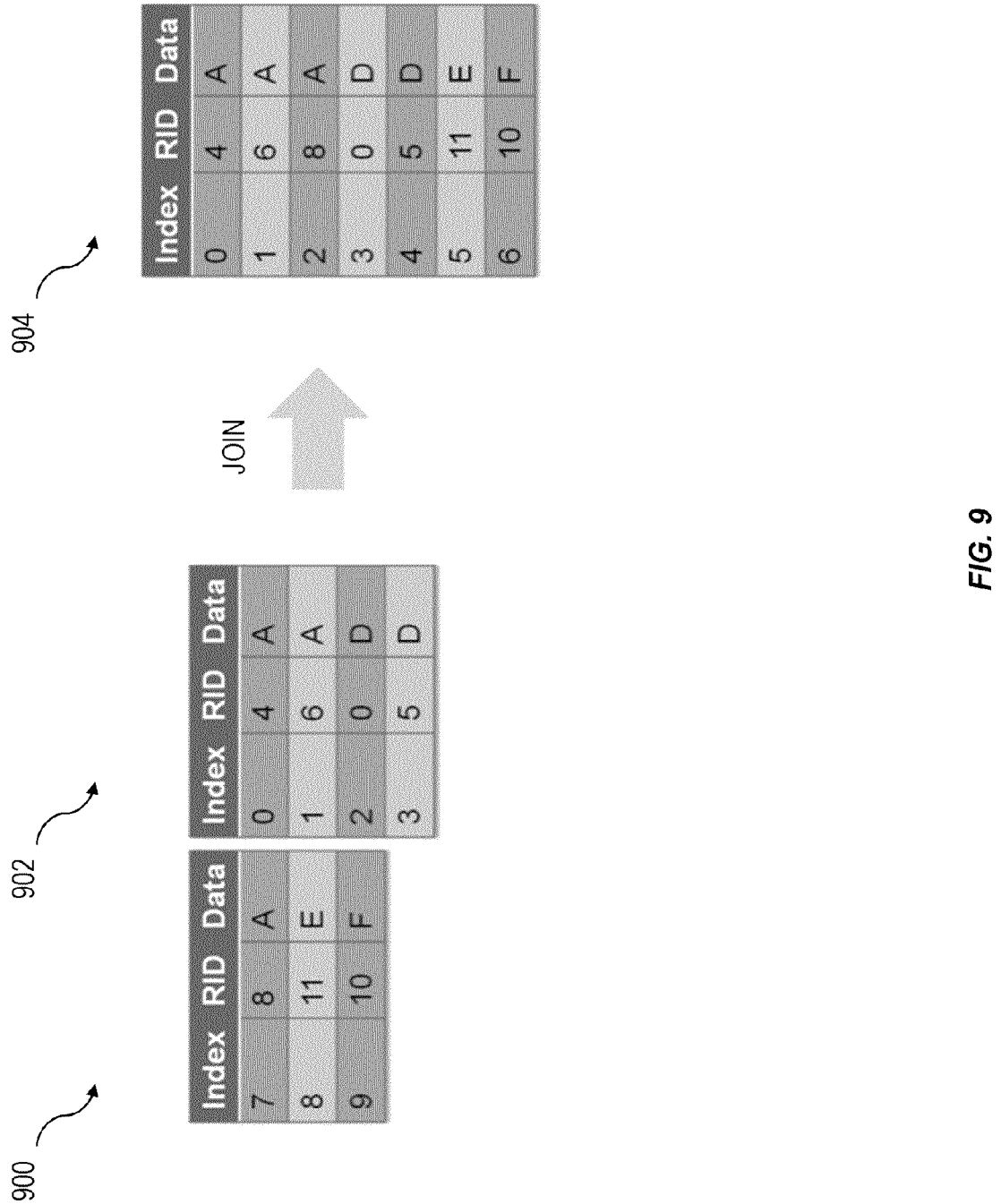
FIG. 9 shows a diagram illustrating features of an example of joining of adjacent main fragments.

In a further example illustrated in FIG. 9, if the size of two adjacent fragments 900, 902 falls under a threshold after a reorganization, those two adjacent fragments 900, 902 can be joined together and reorganized into one new fragment 904. In the case of fragment reorganization, an index update can be required because row index to RowID mapping changes as a result of the fragment reorganization. Additionally, an old (e.g. pre-reorganization) version of the fragment should advantageously be kept, for example until all executing queries finish so that any query that began executing prior to the reorganization and might therefore potentially require access the data in one of the fragments 800, 900, 902 prior to reorganization can complete properly.

Figure 10:
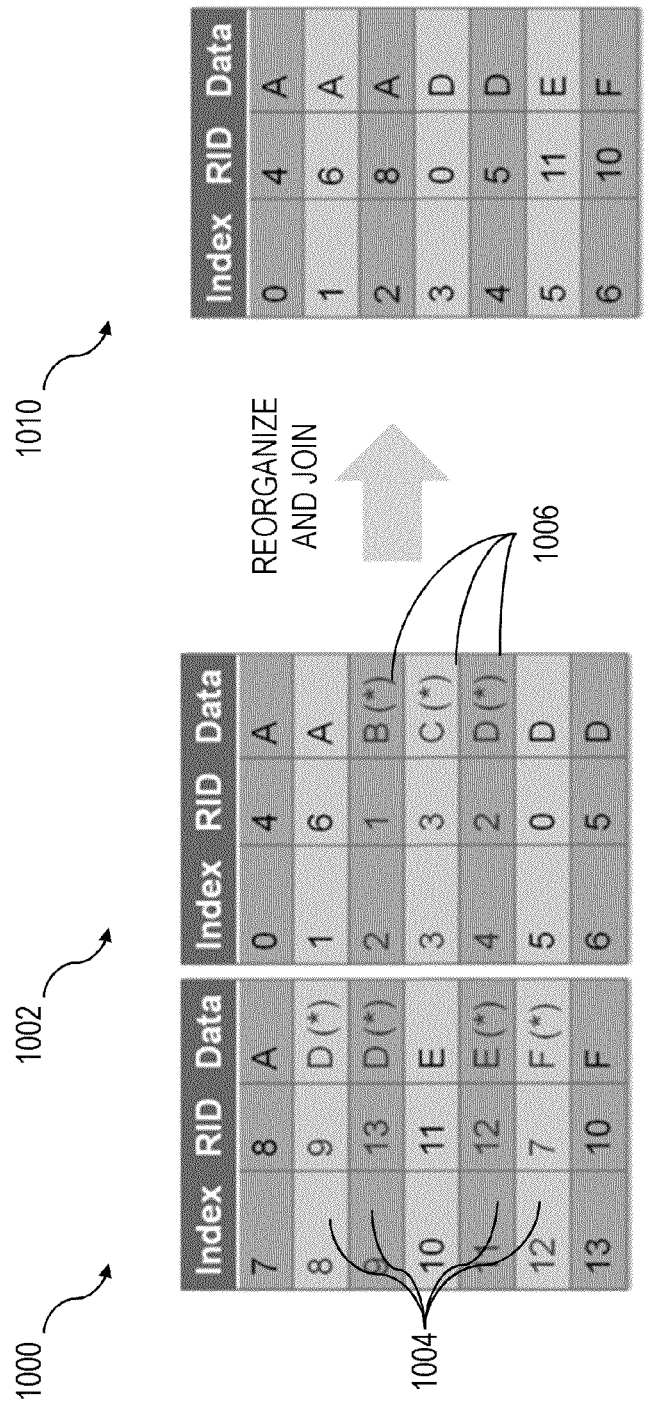
FIG. 10 shows a diagram illustrating features of an example of main fragment reorganization and join.

The reorganization and joining of two fragments can also optionally be optimized together into one step as can be understood by reference to FIG. 10, in which two adjacent fragments 1000, 1002 having a significant number of deleted rows 1004, 1006 can be combined or joined into a single new fragment 1010 at the same time that a reorganization to clean up the deleted rows 1004, 1006 is performed. The new, reorganized and joined fragment 1010 can retain RowIDs of the records from the previous fragments, and in the example of FIG. 10 can include row index ranges of 0 to 3 and 7-9 with row index holes in a range of 4 to 6 and 10-13 corresponding to the deleted rows from the two adjacent fragments 1000, 1002.

A persistent index can be needed for on-disk data, for one or more reasons, such as for example for supporting point queries, range scans, grouping and the like, as well as for limiting scans on huge tables. One or more index types can be defined to handle various data distributions. One common example is a B-tree, which stores values as keys and references to rows (row indices) as values in leaf nodes. Further index types can also be defined (e.g., full-text on-disk index).

To address rows, row indices (which are not stable across various operations discussed herein) can be used instead of RowIDs (which are stable as discussed above). Queries in general tend to work with row indices (and access old versions of a main part of a database when a query crosses a merge). Thus, access to data typically does not require additional indirection via RowID to row index mapping. However, when row indices change (e.g. during a merge or fragment reorganization), the row index must therefore be updated appropriately.

In a case in which a single index spans the whole table, updates of this index can tend be prohibitively expensive, in particular for very large data set. In other words, inserting k new rows into the table could in worst case result in updating O(k) pages of this index. Accordingly, consistent with some implementations of the current subject matter, one index segment can be created per main fragment. Such index segment can be easily recreated after merge of active main fragment, even on-demand only, or in background for closed main fragment. Similarly, after reorganization of a closed main fragment, corresponding index segment can be recreated.

Figure 11:
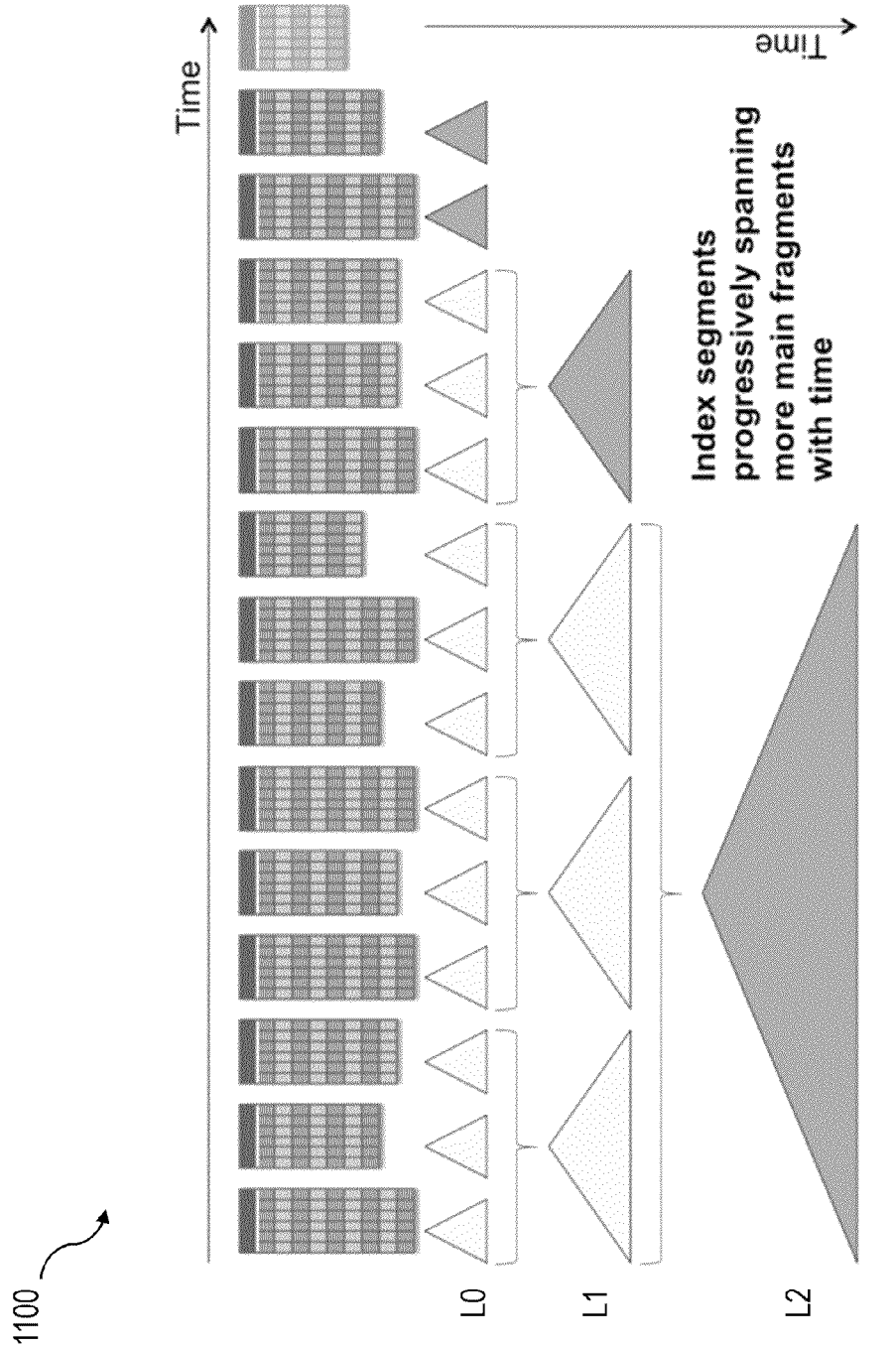
FIG. 11 shows a diagram illustrating features of an example of a segmented Index

Keeping individual index segments for each main fragment can also create prohibitive costs for querying of data, for example because each index segment would then need to be considered. To address this potential issue, when a count of index segments on a certain level reaches some defined maximum m, those segments will be merged to form a single, bigger segment on the next level (this is an operation with linear complexity). This limits number of index trees to scan on query to an affordable maximum. FIG. 11 shows a diagram illustrating features of a segmented index 1100 for a simple example. Consistent with implementations of this aspect of the current subject matter, index segments can progressively span more main fragments with time. Level 0 (e.g. L0) index segments can span a single fragment, while higher level indexes (e.g. L1, L2, L3, etc., can span progressively larger numbers of fragments. Higher level index segments can be formed by combining level index segments for two or more adjacent fragments. In other words, a larger number of older fragments can be spanned by a single index than a number of newer fragments. For instance, with m=8 and 100M rows per main fragment, 10K fragments are needed for a table with a trillion rows. Those 10K fragments can be addressed by 2 L4 segments+3 L3 segments+4 L2 segments+1 L1 segment+8 L0 segments, i.e., in total 18 index segments. In any case, for k main fragments, the number of index segments is bounded at most at $O(m \log_m k)$, i.e., for our example exactly at 33 (8 L0–L3 segments+1 L4 segment when 8776 fragments are reached).

As an optimization, minimum value, maximum value, value histogram and a Bloom filter for each index segment can be tracked, so some index segments can be easily ignored during query processing. If a closed main fragment is reorganized, the index segment covering this main fragment can therefore be updated accordingly. In case this update results in a L0 index segment, the index segment can be simply rebuilt. For L1 and higher index segments, row indices in leaf nodes of the index segment must be updated to point to new row indices after reorganization. A worst case complexity of this operation is typically O(l), where l signifies a number of leaf nodes in the index. Because reorganization of older main fragments is progressively less probable, it is also progressively less probable that a higher-level index segment needs to be updated.

In some implementations of the current subject matter, multi-temperature handling can allow storing data of various levels of importance on different media types and to optimize caching weight. One or more of several approaches can be used to define a data temperature. In one example, a temperature of data can be determined based on assigning an implicit data temperature by data arrival (e.g., by fragment). Older fragments can be moved to slower storage. This approach can provide advantages in that row movement is not required (e.g. no row ID changes or logging for temperature change are required). In another example, an access-based criteria can be used to assign a temperature. A variety of approaches can measure hotness of the data. Additional data structures can be used to keep meta information about data temperature.

In still another example, a semantically-defined data temperature can be used. In such an implementation, temperature can be defined by an application semantically, for example using a value based approach (based on values of a single row), an application-defined formula, a procedural code, one or more non-enforced referential constraints, or the like. In this approach, a specific application can define the semantics.

Data movement can be implemented upon detection of a data temperature change. For example, in a case of n application-specific and access-based temperature definition, data is generally between temperature fragments. These fragments can be joined in one logical table for query processing. Since table fragments may not share a single RowID space, the data movement needs to be logged. However, rather than logging complete data, in some implementations of the current subject matter, just the RowID value in an original and a new temperature fragment can be logged for a data record. This information can be used also during log replay (also in hot standby log shipping continuous replay) to efficiently move data.

FIG. 12, FIG. 13, FIG. 14, FIG. 15, and FIG. 16 show process flow charts 1200, 1300, 1400, 1500, 1600 illustrating method features, all or some of which can be included in an implementation consistent with the aspect of the current subject matter.

Figure 12:
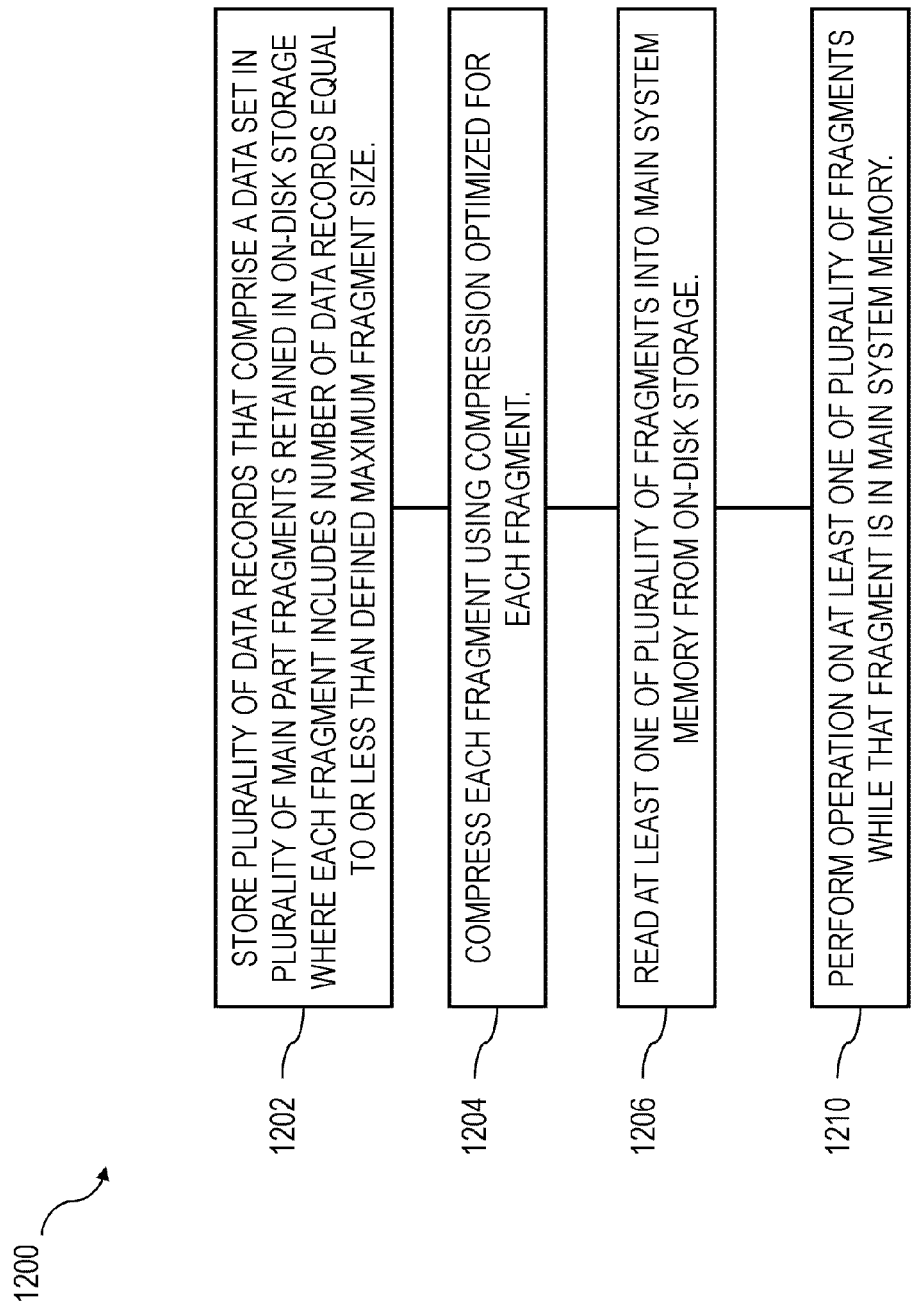
FIG. 12 shows a process flow diagram illustrating aspects of a method having one or more features consistent with implementations of the current subject matter.

As shown in the process flow chart 1200 of FIG. 12, at 1202 a plurality of data records that comprise a data set are stored in a plurality of main part fragments retained in on-disk storage. Each fragment includes a number of data records that is equal to or less than a defined maximum fragment size. At 1204, each fragment of the plurality of fragments is compressed using a compression that is optimized for each fragment. At least one of the plurality of fragments is read into main system memory from the on-disk storage at 1206, and at 1210 an operation is performed on the at least one of the plurality of fragments while the at least one of the plurality of fragments is in the main system memory.

Figure 13:
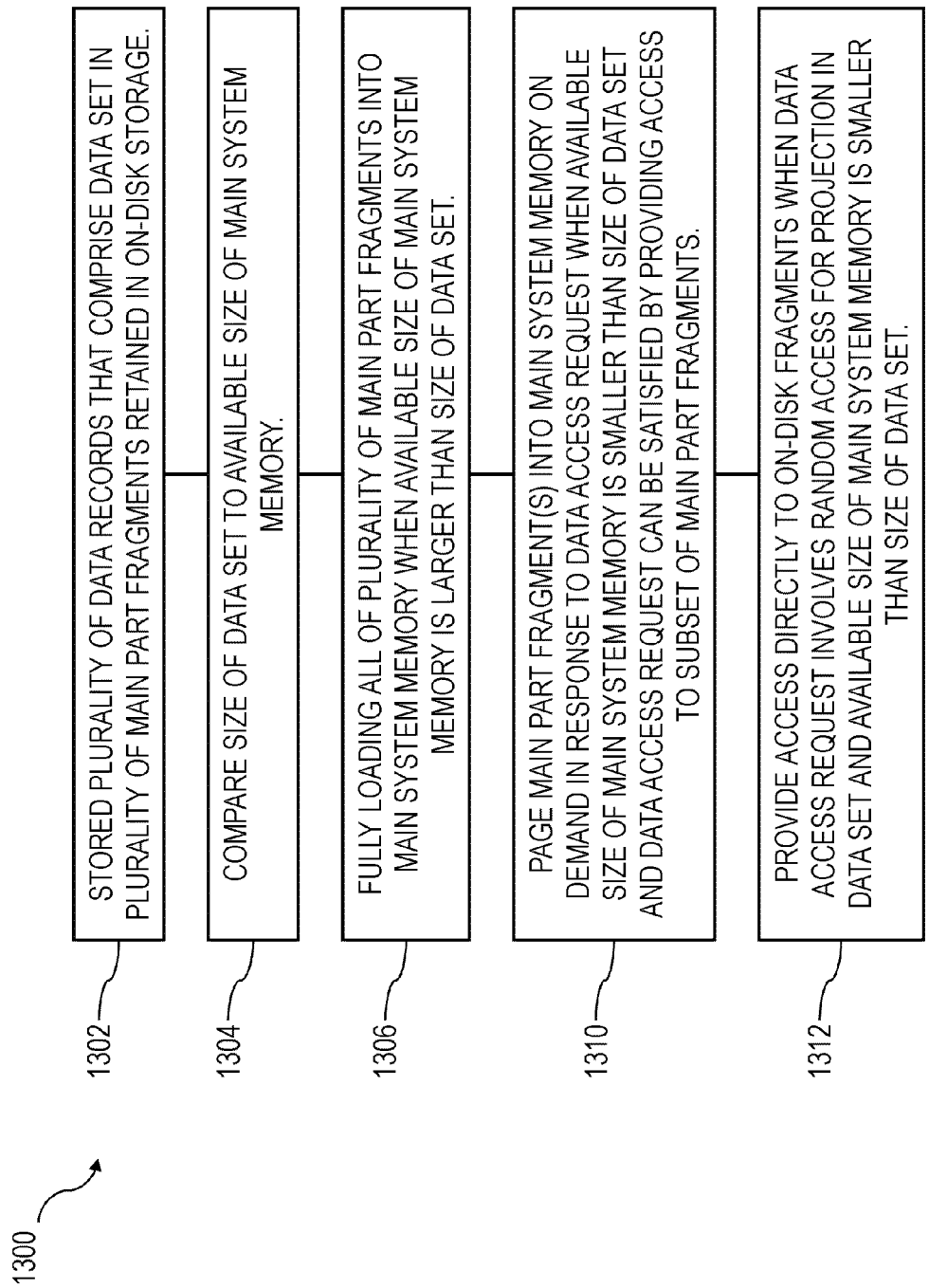
FIG. 13 shows a process flow diagram illustrating aspects of another method having one or more features consistent with implementations of the current subject matter.

As shown in the process flow chart 1300 of FIG. 13, at 1302 a plurality of data records that comprise a data set are stored in a plurality of main part fragments retained in on-disk storage. A size of the data set is compared at 1304 to an available size of main system memory. At 1306, all of the plurality of main part fragments are fully loaded into the main system memory when the available size of the main system memory is larger than the size of the data set, and at 1310 one or more of the of main part fragments is/are paged into the main system memory on demand in response to a data access request when the available size of the main system memory is smaller than the size of the data set and the data access request can be satisfied by providing access to a subset of the main part fragments. At 1312, access is provided directly to the on-disk fragments when the data access request involves random access for projection in the data set and the available size of the main system memory is smaller than the size of the data set.

Figure 14:
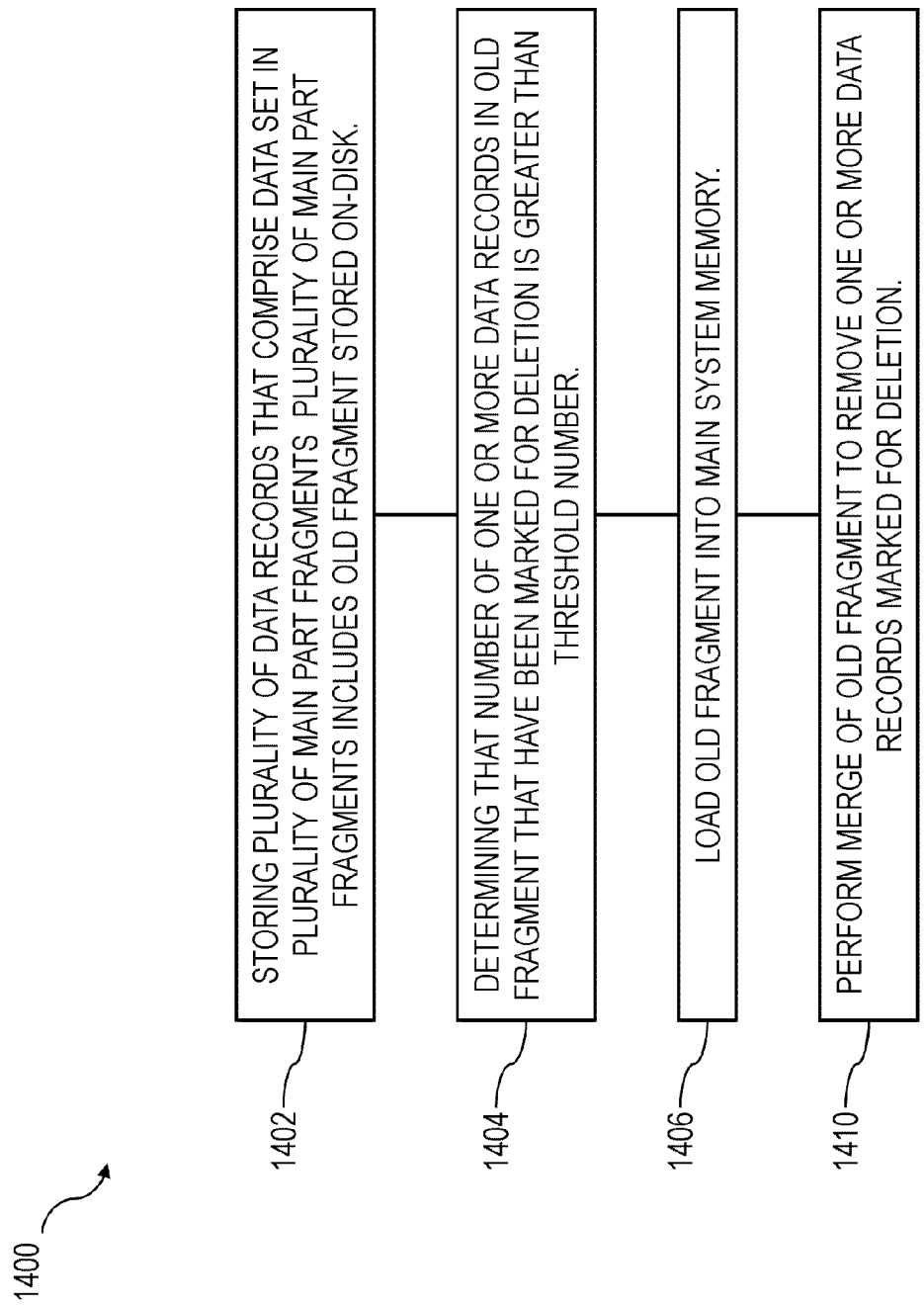
FIG. 14 shows a process flow diagram illustrating aspects of another method having one or more features consistent with implementations of the current subject matter.

As shown in the process flow chart 1400 of FIG. 14, at 1402 a plurality of data records that comprise a data set are stored in a plurality of main part fragments. The plurality of main part fragments include an old fragment stored on-disk. At 1404 a determination is made that a number of one or more data records in the old fragment that have been marked for deletion is greater than a threshold number. The old fragment is loaded into main system memory at 1406, and at 1410 a merge of the old fragment is performed to remove the one or more data records marked for deletion.

Figure 15:
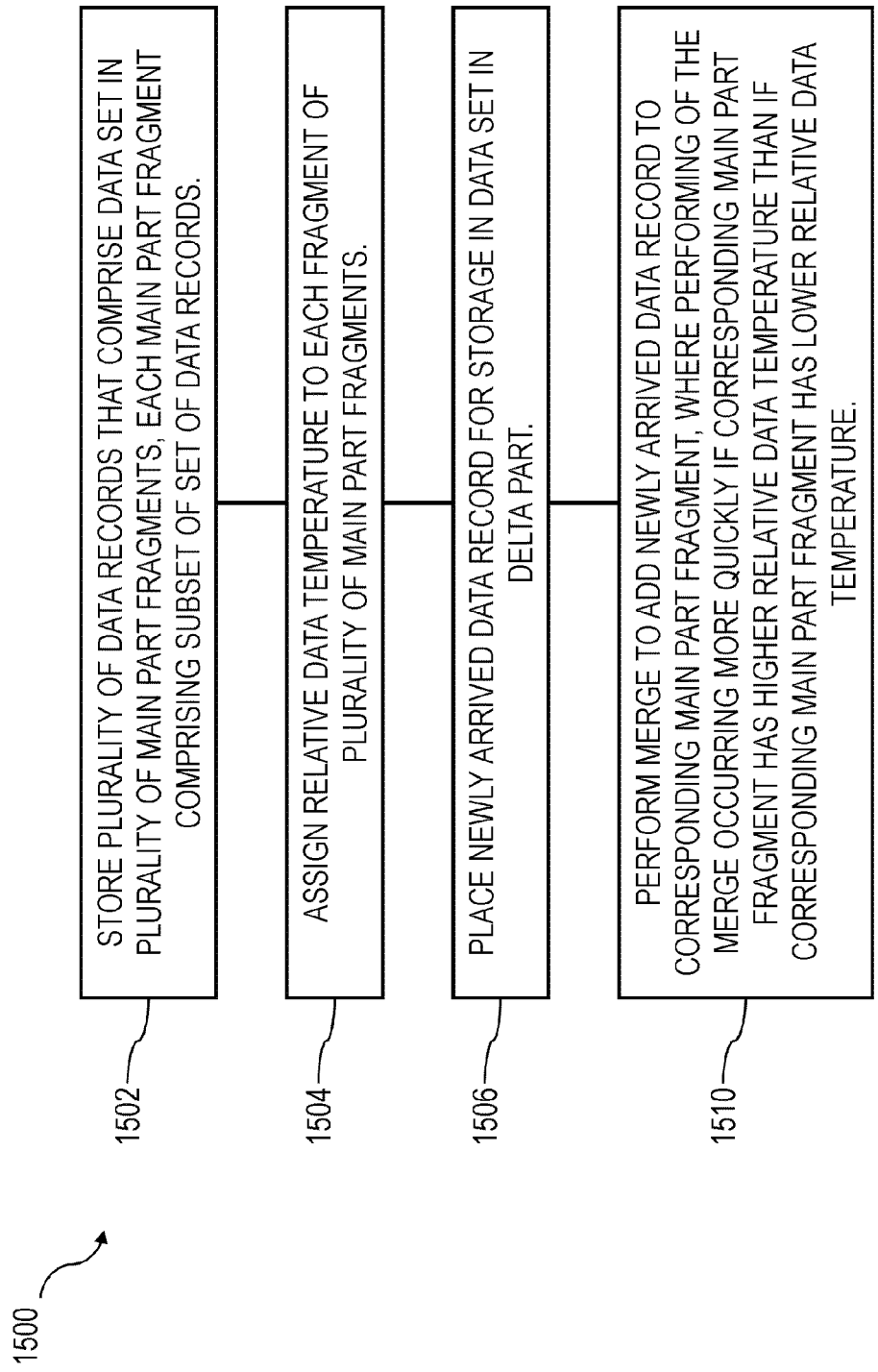
FIG. 15 shows a process flow diagram illustrating aspects of another method having one or more features consistent with implementations of the current subject matter.

As shown in the process flow chart 1500 of FIG. 15, at 1502, a plurality of data records that comprise a data set is stored in a plurality of main part fragments. Each main part fragment includes a subset of the set of data records. At 1504, a relative data temperature is assigned to each fragment of the plurality of main part fragments. A newly arrived data record is placed at 1506 for storage in the data set in a delta part. A merge is performed at 1510 to add the newly arrived data record to a corresponding main part fragment. The performing of the merge occurs more quickly if the corresponding main part fragment has a higher relative data temperature than if the corresponding main part fragment has a lower relative data temperature.

Figure 16:
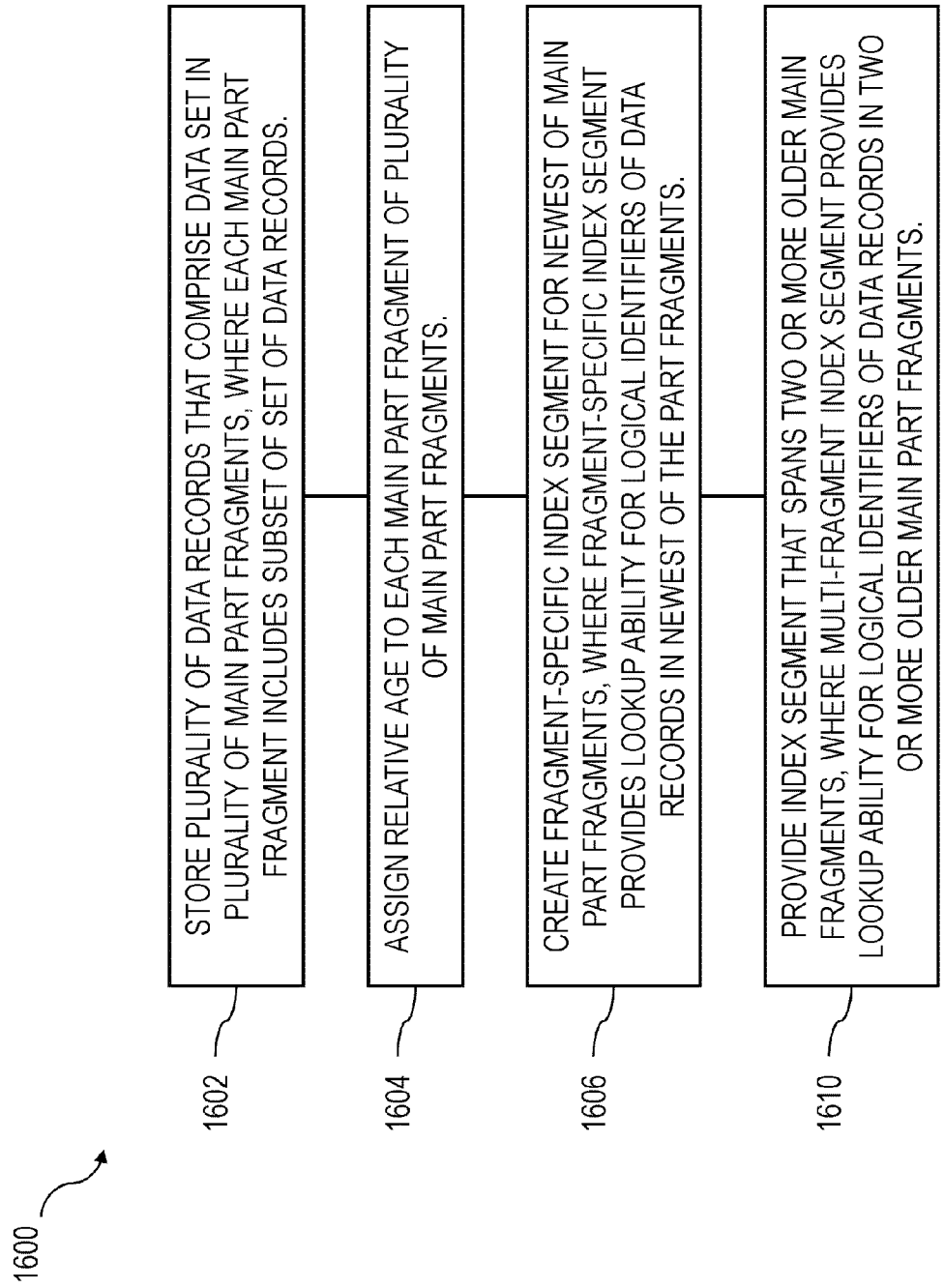
FIG. 16 shows a process flow diagram illustrating aspects of another method having one or more features consistent with implementations of the current subject matter.

As shown in the process flow chart 1600 of FIG. 16, at 1602 a plurality of data records that comprise a data set are storied in a plurality of main part fragments. Each main part fragment includes a subset of the set of data records. A relative age is assigned to each main part fragment of the plurality of main part fragments at 1604. At 1606, a fragment-specific index segment is created for a newest of the main part fragments. The fragment-specific index segment provides a lookup ability for logical identifiers of data records, for example in just the newest of the main part fragments. At 1610, an index segment that spans the two or more older main fragments is provided for two or more older main fragments. The multi-fragment index segment provides a lookup ability for logical identifiers of data records in the two or more older main part fragments.

Figure 17:
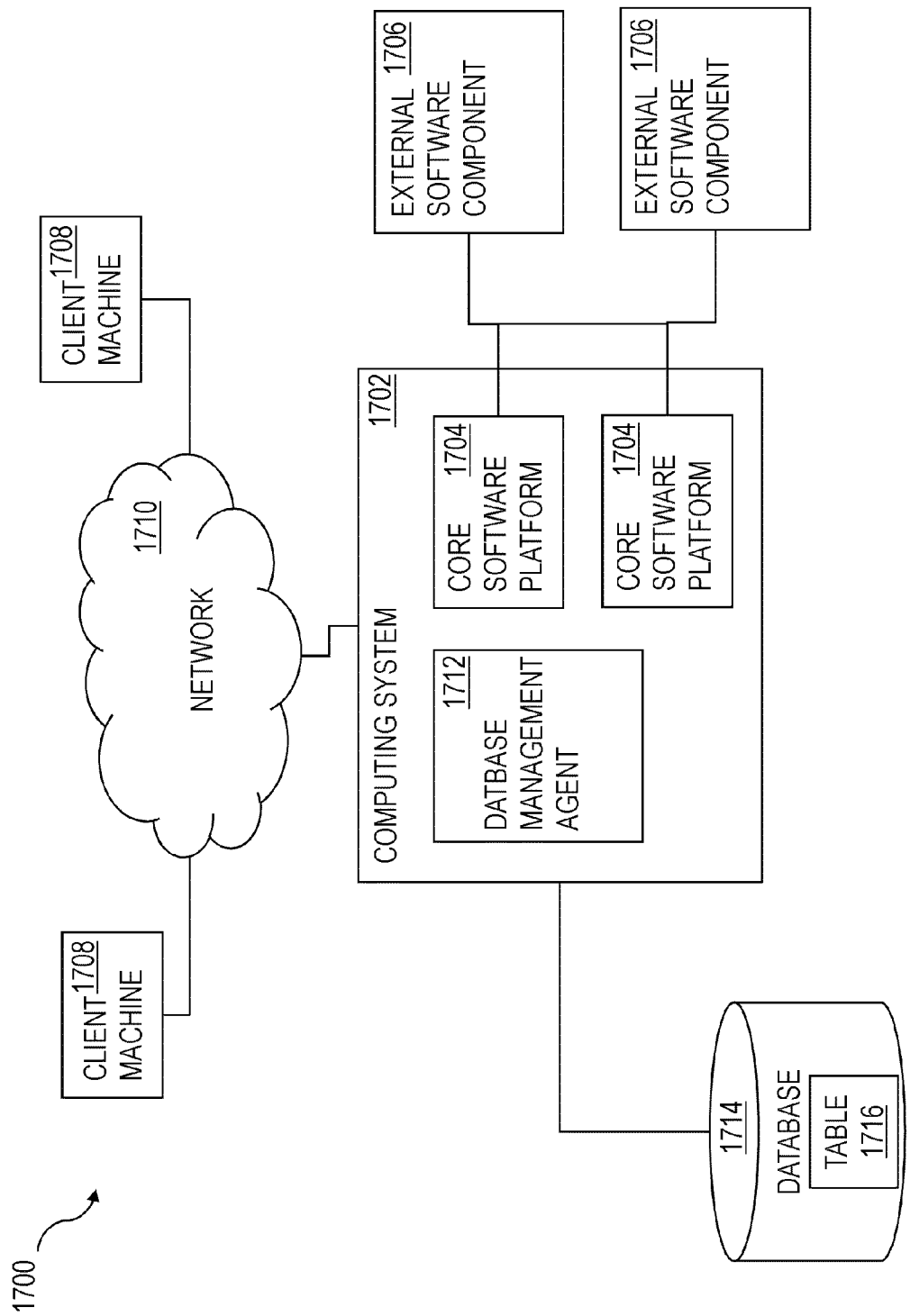
FIG. 17 is a diagram illustrating features of a business software system architecture consistent with at least some implementations of the current subject matter.

Consistent with some implementations of the current subject matter, the core software platform of an enterprise resource planning (ERP) system, other business software architecture, or other data-intensive computing application or software architecture can be provided as a standalone, customized software installation that runs on one or more processors that are under the control of a specific organization. This arrangement can be very effective for a large-scale organization that has very sophisticated in-house information technology (IT) staff and for whom a sizable capital investment in computing hardware and consulting services required to customize a commercially available business software solution to work with organization-specific business processes and functions is feasible. FIG. 17 shows a diagram of a system consistent with such an implementation. A computing system 1702 can include one or more core software platform modules 1704 providing one or more features of the business software system. The computing system can also aggregate or otherwise provide a gateway via which users can access functionality provided by one or more external software components 1706. Client machines 1708 can access the computing system, either via a direct connection, a local terminal, or over a network 1710 (e.g. a local area network, a wide area network, a wireless network, the Internet, or the like).

A data management agent 1712 or other comparable functionality can access a database management system 1714 that stores and provides access to data (e.g. definitions of business scenarios, business processes, and one or more business configurations as well as data, metadata, master data, etc. relating to definitions of the business scenarios, business processes, and one or more business configurations, and/or concrete instances of data objects and/or business objects that are relevant to a specific instance of a business scenario or a business process, and the like. The database management system 1714 can include parallelization features consistent with those described herein.

Figure 18:
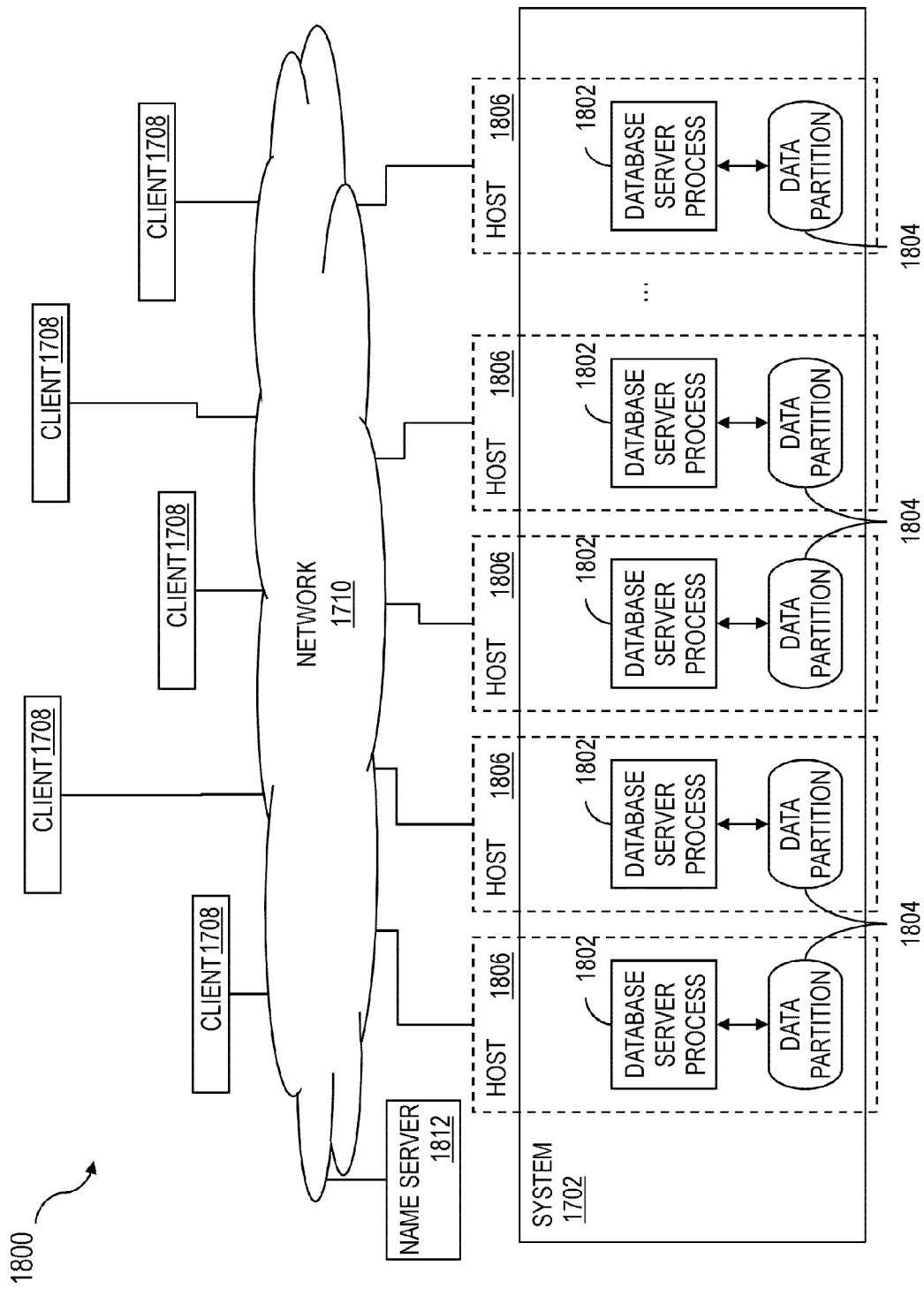
FIG. 18 is a diagram illustrating features of a database management system architecture consistent with at least some implementations of the current subject matter.

For data distribution purposes, tables or ranges within tables can be assigned to different database partitions that are assigned to different hosts, for example for scalability reasons. FIG. 18 shows an example of an enterprise resource system architecture 1800 consistent with an implementation that includes data distribution for scalability reasons. Such a configuration can be used for large, on-premise or stand-alone systems with high performance requirements. Each data server process 1802 and its associated data partition 1804 can be assigned to a discrete host 1806. A host 1806 can be a standalone machine with one or more physical processors or a virtual machine on a larger system 1702 as depicted in FIG. 18. A central component, labeled as a name server 1812 in FIG. 18, knows the topology of the system and how data is distributed. In a system with data distribution, the name server knows which tables or partitions of tables are located on which data server process 1802. One or more clients 1814 (e.g. client machines 1708) can access the name server 1812, either via a direct connection or over a network 1816.

In a data distribution scenario, the partitioning can be done table wise or also by splitting tables. With table wise partitioning, the name server assigns new tables to a database server process 1802 based on the current distribution of tables (number of tables assigned to each database server process 1802). Then data for this table will reside only on that database server process 1802. It is also possible to specify that a table is split over multiple database server processes 1802. The name server 1812 can optionally partition the table based on a size estimation specified by the application. When records are inserted into a split table, the records can be distributed to other database server processes 1802 based on name server information.

Smaller organizations can also benefit from use of business software functionality. However, such an organization may lack the necessary hardware resources, IT support, and/or consulting budget necessary to make use of a standalone business software software architecture product and can in some cases be more effectively served by a software as a service (SaaS) arrangement in which the business software system architecture is hosted on computing hardware such as servers and data repositories that are maintained remotely from the organization's location and accessed by authorized users at the organization via a thin client, such as for example a web browser, over a network.

In a software delivery configuration in which services of an business software system are provided to each of multiple organizations are hosted on a dedicated system that is accessible only to that organization, the software installation at the dedicated system can be customized and configured in a manner similar to the above-described example of a standalone, customized software installation running locally on the organization's hardware. However, to make more efficient use of computing resources of the SaaS provider and to provide important performance redundancies and better reliability, it can be advantageous to host multiple tenants on a single system that includes multiple servers and that maintains data for all of the multiple tenants in a secure manner while also providing customized solutions that are tailored to each tenant's business processes.

Figure 19:
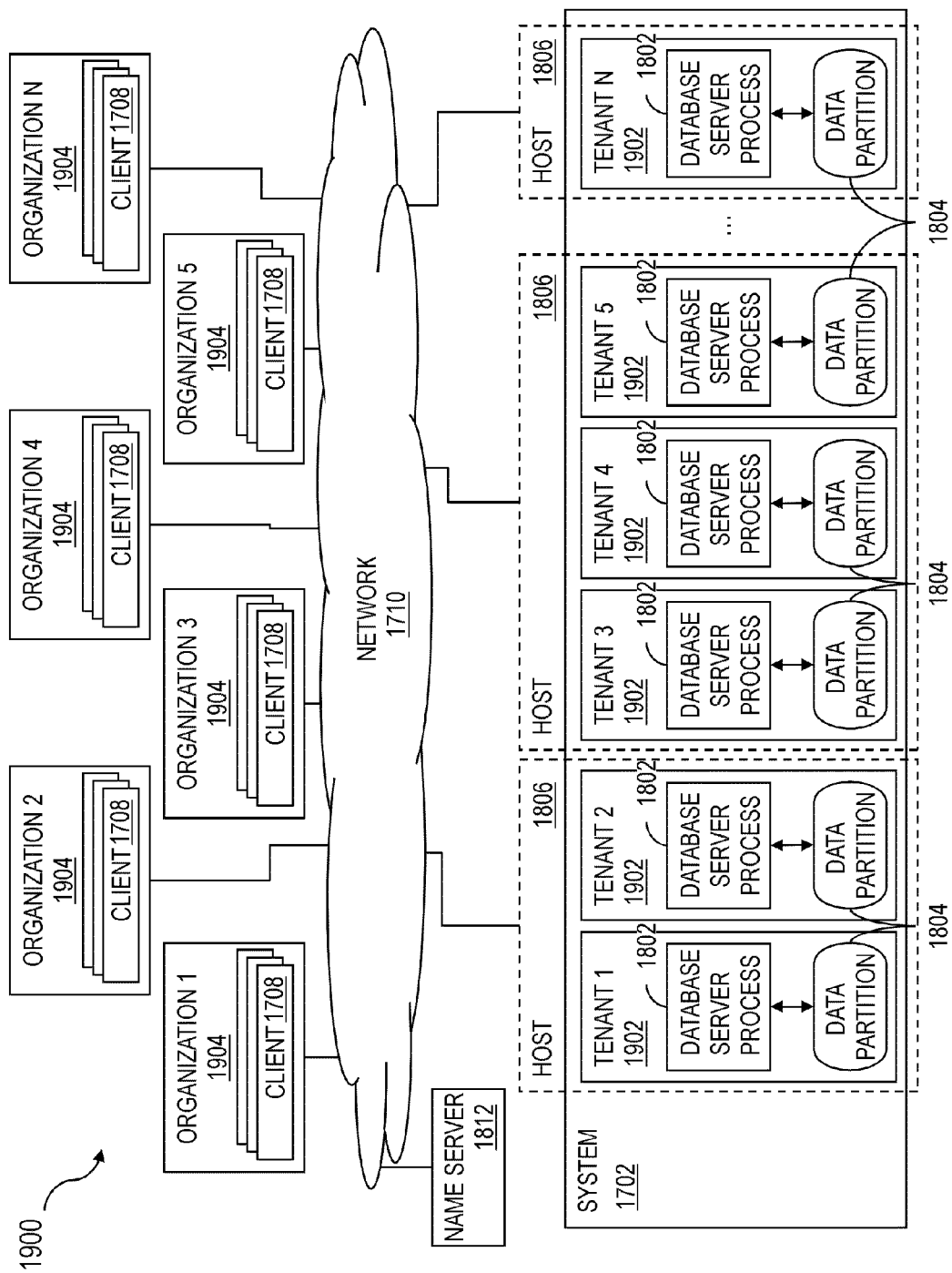
FIG. 19 is a diagram illustrating features of another database management system architecture consistent with at least some implementations of the current subject matter, When practical, similar reference numbers denote similar structures, features, or elements.

Data partitioning consistent with implementations of the current subject matter can also be used in a multi-tenancy environment as illustrated in the system architecture 1900 of FIG. 19. Multiple tenants 1902, each isolated from one another and available to be accessed by clients 1814 within a separate organization 1904 of a plurality of organizations via a network 1816, can be hosted by a same host 1806, which can be a virtual machine on a larger system 1702 as shown in FIG. 19 or a separate system that includes one or more physical processors. Tenants 1902 can also optionally be distributed across multiple database server processes 1802 on more than one host 1806. In this manner, tables or ranges within tables are assigned to different database server processes 1802 that are assigned to different hosts 1806 for scalability reasons. One or more tenants 1902 can alternatively be served by a single database server process 1802 accessing a data partition 1804 (or multiple data partitions 1804) for the respective tenant 1902 that is isolated from other tenants 1902.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer program product comprising a non-transitory machine-readable medium storing instructions that, when executed by at least one programmable processor, cause the at least one programmable processor to perform operations comprising:
   storing, in a plurality of main part fragments, a plurality of data records that comprise a data set, the plurality of main part fragments comprising an old fragment stored on-disk;
   determining that a number of one or more data records in the old fragment that have been marked for deletion is greater than a threshold number;
   loading the old fragment into main system memory;
   performing a merge of the old fragment to remove the one or more data records marked for deletion;
   determining a total number of data records not marked for deletion in the old fragment plus a second old fragment that is adjacent to the old fragment that is less than a defined maximum fragment size;
   loading the second old fragment into main system memory; and
   performing a join of the old fragment and the second old fragment to generate a single old fragment.

2. A computer program product as in claim 1, wherein the merge and the join are performed for the old fragment and the second old fragment in a single combined operation.

3. A computer program product as in claim 1, wherein the merge comprises:
   creating a temporary, in-memory data structure containing data from the old fragment and committed rows from an existing delta;
   re-sorting the temporary, in-memory data structure to allow achievement of maximal compression of the data records; and
   storing data from the re-sorted, temporary, in-memory data structure to a new version of the old fragment.

4. A computer program product as in claim 1, wherein each fragment of the plurality of main part fragments comprises a local row index and a mapping of the local row index to RowID values in a global RowID column for the data set, the RowID values in the RowID column being unique, logical references to the data records of the data set, the local row index comprising physical locations of the data records in the main part fragment.

5. A computer program product as in claim 1, wherein each of the plurality of main part fragments comprises at least one row set arranged in a temporal order.

6. A computer program product as in claim 1, wherein the threshold number is relative to a row size of the old fragment.

7. A system comprising:
   at least one processor; and
   a machine-readable medium storing instructions that, when executed by the at least one programmable processor, cause the at least one programmable processor to perform operations comprising:
   storing, in a plurality of main part fragments, a plurality of data records that comprise a data set, the plurality of main part fragments comprising an old fragment stored on-disk;
   determining that a number of one or more data records in the old fragment that have been marked for deletion is greater than a threshold number;
   loading the old fragment into main system memory;
   performing a merge of the old fragment to remove the one or more data records marked for deletion;
   determining a total number of data records not marked for deletion in the old fragment plus a second old fragment that is adjacent to the old fragment that is less than a defined maximum fragment size;
   loading the second old fragment into main system memory; and
   performing a join of the old fragment and the second old fragment to generate a single old fragment.

8. A system as in claim 7, wherein the merge and the join are performed for the old fragment and the second old fragment in a single combined operation.

9. A system as in claim 7, wherein the merge comprises:
   creating a temporary, in-memory data structure containing data from the old fragment and committed rows from an existing delta;
   re-sorting the temporary, in-memory data structure to allow achievement of maximal compression of the data records; and
   storing data from the re-sorted, temporary, in-memory data structure to a new version of the old fragment.

10. A system as in claim 7, wherein each fragment of the plurality of main part fragments comprises a local row index and a mapping of the local row index to RowID values in a global RowID column for the data set, the RowID values in the RowID column being unique, logical references to the data records of the data set, the local row index comprising physical locations of the data records in the main part fragment.

11. A system as in claim 7, wherein each of the plurality of main part fragments comprises at least one row set arranged in a temporal order.

12. A computer-implemented method comprising:
storing, in a plurality of main part fragments, a plurality of data records that comprise a data set, the plurality of main part fragments comprising an old fragment stored on-disk;
determining that a number of one or more data records in the old fragment that have been marked for deletion is greater than a threshold number;
loading the old fragment into main system memory;
performing a merge of the old fragment to remove the one or more data records marked for deletion;
determining a total number of data records not marked for deletion in the old fragment plus a second old fragment that is adjacent to the old fragment that is less than a defined maximum fragment size;
loading the second old fragment into main system memory; and
performing a join of the old fragment and the second old fragment to generate a single old fragment.

13. A computer-implemented method as in claim 12, wherein the merge and the join are performed for the old fragment and the second old fragment in a single combined operation.

14. A computer-implemented method as in claim 12, wherein the merge comprises:
creating a temporary, in-memory data structure containing data from the old fragment and committed rows from an existing delta;
re-sorting the temporary, in-memory data structure to allow achievement of maximal compression of the data records; and
storing data from the re-sorted, temporary, in-memory data structure to a new version of the old fragment.

15. A computer-implemented method as in claim 12, wherein each fragment of the plurality of main part fragments comprises a local row index and a mapping of the local row index to RowID values in a global RowID column for the data set, the RowID values in the RowID column being unique, logical references to the data records of the data set, the local row index comprising physical locations of the data records in the main part fragment.

16. A computer-implemented method as in claim 12, wherein each of the plurality of main part fragments comprises at least one row set arranged in a temporal order.

17. A computer-implemented method as in claim 12, wherein at least one of the storing, the determining that the number of one or more data records in the old fragment that have been marked for deletion is greater than a threshold number, the loading the old fragment, the performing the merge, the determining a total number of data records not marked for deletion, the loading the second old fragment, and the performing the join are performed by a system comprising at least one programmable processor.

* * * * *